(12) United States Patent
Jung et al.

(10) Patent No.: US 10,271,252 B2
(45) Date of Patent: Apr. 23, 2019

(54) MOBILE COMMUNICATION IN MACRO-CELL ASSISTED SMALL CELL NETWORKS

(71) Applicant: Intel IP Corporation, Santa Clara, CA (US)

(72) Inventors: Hyejung Jung, Palatine, IL (US); Candy Yiu, Portland, OR (US); Qinghua Li, San Ramon, CA (US); Pingping Zong, Randolph, NJ (US); Youn Hyoung Heo, Seoul (KR); Yujian Zhang, Beijing (CN); Mo-Han Fong, Sunnyvale, CA (US); Abhijeet Bhorkar, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 87 days.

(21) Appl. No.: 15/508,331

(22) PCT Filed: Jun. 24, 2015

(86) PCT No.: PCT/US2015/037361
§ 371 (c)(1),
(2) Date: Mar. 2, 2017

(87) PCT Pub. No.: WO2016/053426
PCT Pub. Date: Apr. 7, 2016

(65) Prior Publication Data
US 2017/0311217 A1    Oct. 26, 2017

Related U.S. Application Data

(60) Provisional application No. 62/058,619, filed on Oct. 1, 2014.

(51) Int. Cl.
*H04W 36/04* (2009.01)
*H04W 48/20* (2009.01)
(Continued)

(52) U.S. Cl.
CPC ....... *H04W 36/04* (2013.01); *H04W 36/0061* (2013.01); *H04W 36/00835* (2018.08);
(Continued)

(58) Field of Classification Search
CPC ............. H04W 36/30; H04W 36/0094; H04W 88/08; H04W 24/10
(Continued)

(56) References Cited

U.S. PATENT DOCUMENTS 6,026,301 A * 2/2000 Satarasinghe ......... H04W 36/32
                                                        455/436
7,504,547 B2    3/2009 Tucker
(Continued)

FOREIGN PATENT DOCUMENTS

CN    2904127 Y    5/2007
CN    202217318 U    5/2012
(Continued)

OTHER PUBLICATIONS

Extended European Search Report dated Mar. 14, 2018 for European Patent Application 15846982.5.
(Continued)

*Primary Examiner* — Sam Bhattacharya
(74) *Attorney, Agent, or Firm* — Eschweiler & Potashnik, LLC

(57) ABSTRACT

A User Equipment (UE) device operates to directly determine a target small cell for access or handover with the assistance of a macro cell network. The UE directly generates the connection and selects which small cell to access from among a subset of small cells chosen of a set of candidate small cells. The UE is provided dedicated assistance information from the evolved node B (eNB) or macro network device. The dedicated assistance information enables the UE to measure data from the candidate small (Continued)

cells within a heterogeneous network environment. The UE shares the measured data and connects directly to the selected small cell for an access or handover operation.

23 Claims, 7 Drawing Sheets

(51) Int. Cl.
  *H04W 48/12* (2009.01)
  *H04W 36/00* (2009.01)
  *H04W 36/02* (2009.01)
  *H04W 16/32* (2009.01)

(52) U.S. Cl.
  CPC ......... *H04W 36/023* (2013.01); *H04W 48/12* (2013.01); *H04W 48/20* (2013.01); *H04W 16/32* (2013.01)

(58) Field of Classification Search
  USPC .................. 455/436, 437, 446; 370/329, 332
  See application file for complete search history.

(56) References Cited

U.S. PATENT DOCUMENTS

| | | |
|---|---|---|
| 9,265,049 B2 | 2/2016 | Palanki et al. |
| 9,867,103 B2 | 1/2018 | Jung et al. |
| 2006/0042734 A1 | 3/2006 | Turner et al. |
| 2010/0048217 A1* | 2/2010 | Deshpande .......... H04J 11/0069 455/446 |
| 2010/0278141 A1 | 11/2010 | Choi-Grogan et al. |
| 2012/0106516 A1 | 5/2012 | Jung et al. |
| 2013/0157643 A1 | 6/2013 | Yoo et al. |
| 2014/0045505 A1 | 2/2014 | Henry et al. |
| 2014/0241242 A1 | 8/2014 | Josiam et al. |
| 2015/0071206 A1* | 3/2015 | Seo ...................... H04L 5/0053 370/329 |

FOREIGN PATENT DOCUMENTS

| | | |
|---|---|---|
| JP | 2012010065 A | 1/2012 |
| WO | 2013151327 A1 | 10/2013 |

OTHER PUBLICATIONS

"Discussion on small cell discovery signal." Intel Corporation. Agenda Item: 7.2.4.2.2. 3GPP TSG-RAN WG1 #76bis. Shenzhen, China Mar. 31-Apr. 4, 2014. R1-141156. 7 pages.

"Measurements for small cells in UMTS." Source: Ericsson, ST-Ericsson. Agenda Item: 10.2.3 Mass small cell deployment. 3GPP TSG RAN WG2 #83. Barcelona, Spain. Aug. 19-23, 2013. R2-132707. 8 pages.

"Views on discovery signal design for Rel-12 small cell enhancement." Source: NTT DOCOMO. Agenda Item: 7.2.4.2.2. 3GPP TSG RAN WG1 Meeting #76, Prague, Czech Republic, Feb. 10-14, 2013, R1-140622. 9 pages.

"Discussion on Small Cell handover," Source: Institute for Information Industry (III). Agenda Item: 7.3.5.3. 3GPP TSG RAN WG1 Meeting #72, St. Julian's, Malta, Jan. 28-Feb. 1, 2013. R1-130358. 4 pages.

"UL Transmit Beamforming for UL MIMO Enhancement," Source: Alcatel-Lucent Shanghai Bell, Alcatel-Lucent. Agenda Item: 6.7.3. 3GPP TSG RAN WG1 Meeting #66. Athens, Greece, Aug. 22-26, 2011. R1-112422, 7 pages.

English translation of Japanese Office Action for Japanese Application JP2017-512032 dated Mar. 27, 2018.

"The usuage of RAN assistance parameters during handover." 3GPP TSG-RAN WG #87. Dresden, Germany. Aug. 18-22, 2014. R2-143475, Agenda item: 5.1. Source: ITRI. 6 pages.

"Handling of the RAN assistance information." 3GPP TSG-RAN Meeting #87. Dresden, Germany. Aug. 18-22, 2014. R2-143723. Agenda Item: 5.1. Source: LG Electronics. 5 pages.

International Search Report and Written Opinion of the International Searching Authority, International Application No. PCT/2015/037361, dated Oct. 20, 2015.

* cited by examiner

MOBILE COMMUNICATION IN MACRO-CELL ASSISTED SMALL CELL NETWORKS

REFERENCE TO RELATED APPLICATIONS

This application is a National Phase entry application of International Patent Application No. PCT/US2015/037361 filed Jun. 24, 2015, which claims priority to U.S. Provisional Application No. 62/058,619, filed Oct. 1, 2014, entitled "MOBILE COMMUNICATION IN MACRO-CELL ASSISTED SMALL CELL NETWORKS", the contents of which are herein incorporated by reference in their entirety.

FIELD

The present disclosure relates to wireless communications, and more specifically, to mobile communications in macro-cell assisted small cell networks.

BACKGROUND

High frequency band (HFB) radio access technology (RAT) using much wider channel bandwidth (e.g. 1~4 GHz) than the current LTE-Advanced system (up to 100 MHz) is expected to provide 10~100 Gbps (Gigabits per second) data rates. Due to large path loss in HFB channels, proper transmit (Tx) and receive (Rx) beamforming is critical to maintain a reliable radio link. When highly directional beams are used to compensate the path loss, the physical link quality is sensitive to a user equipment's (e.g., a mobile device) movement and a slight change in propagation environments, which may change optimal Tx/Rx beam directions and result in abrupt changes in path loss. Thus, frequent radio link failures (RLF) and related serving cell changes, such as with handover operations, are expected in the HFB RAT based small cell network.

DETAILED DESCRIPTION

Figure 1:
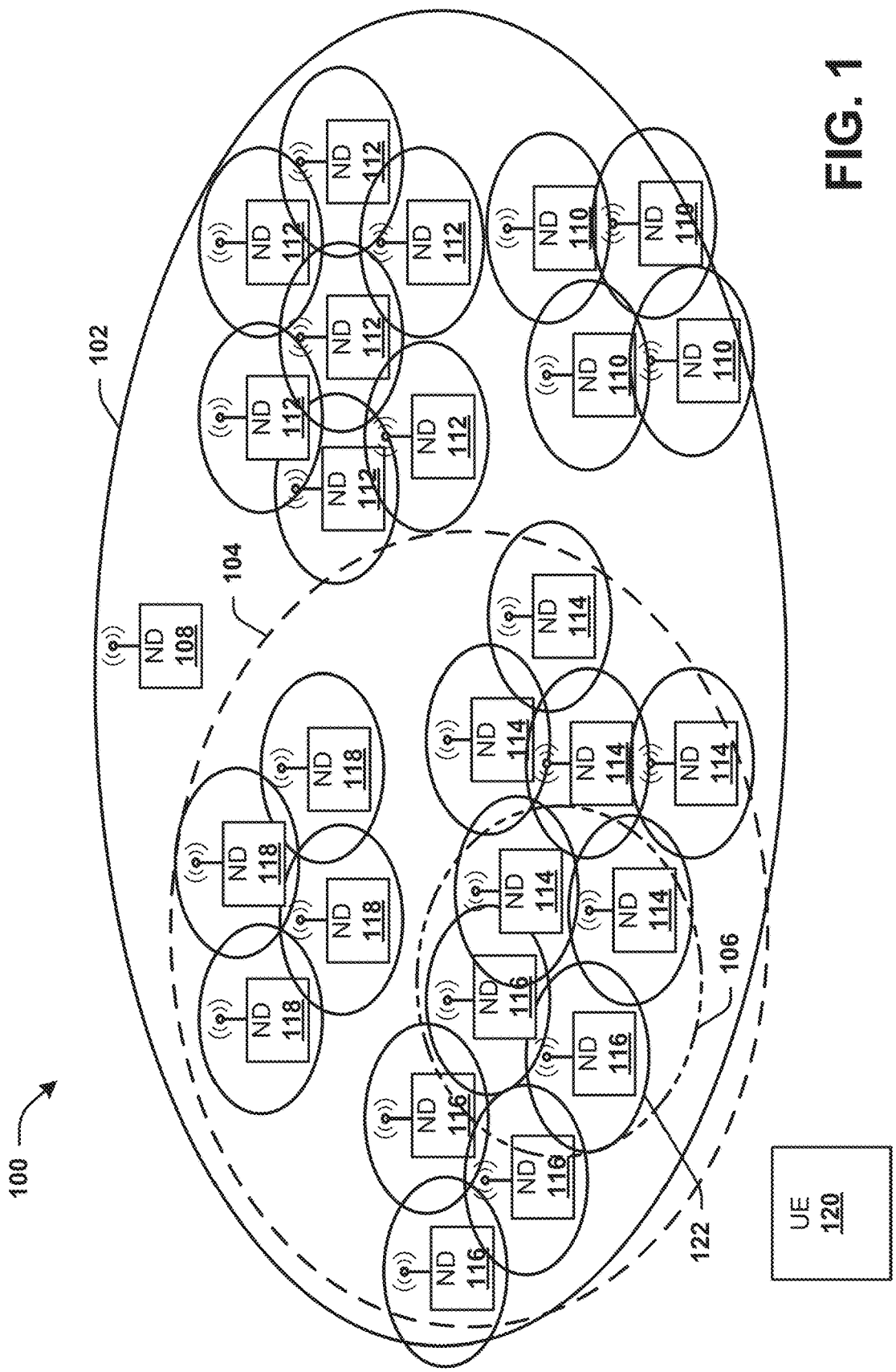
FIG. 1 is a block diagram illustrating a wireless communications environment that can be utilized according to various aspects disclosed.

The present disclosure will be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, a circuit or a circuit element, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components or elements without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Introduction

In consideration of the above described deficiencies, frequent serving cell changes can occur when a large number of small cell network devices (small cells) generating a small cell network are densely deployed. The processes described in this disclosure can achieve fast cell associations and handovers in a densely deployed heterogeneous network of small cell network devices within a macro cell network. The associations and handovers between a mobile or wireless device (e.g., a user equipment (UE)) and network devices can be assisted by a macro cell network device within a larger macro cell network for fast link re-establishment when the UE suffers from poor radio link conditions or other Quality of Service (QoS) considerations with the serving cell (e.g. a small cell or other cell). Dedicated (assistance) information for these processes can be determined and shared by the UE, the macro-cell network device, or any one of small cell network devices within the macro network to assist in the UE directing the access or handover itself.

Assistance information (data) can refer to dedicated assistance information related to the small cells associated with the macro cell that enables cell identification and cell measurement of the small cell network by the UE. The dedicated assistance information can include cell-specific parameters, and be a function of UE location data, UE mobility state estimation data, or access/load data of the network devices, for example. In addition, a cell can refer to a radio resource, and can be defined by downlink/uplink carrier frequencies, corresponding channel bandwidths, and one or more cell identities. A network can refer to one or more connected cells to one or more UEs or network devices, which can comprise one or more processors, memories, communication circuitries or the like as a physical entity that provides one or more cells.

In particular, the UE is configured to directly initiate the associations and handovers for itself within heterogeneous networks having dual-connectivity (e.g., macro and small cell network connectivity with the UE) or carrier aggregation, and with assistance data from the macro cell network or one of the small cell network devices. The macro cell network device can operate to share assistance information with the UE to direct itself for an efficient access or handover operation among the densely deployed small cell network devices. In one example, a UE device comprises a receiver component that can receive assistance information associated with candidate small cells that are considered candidates for potentially becoming a serving or target cell for the UE over other small cells. A control component of the UE can be configured to identify a UE-specific cell set that includes a subset of the candidate small cells. The UE can utilize the control component, for example, to further select a first small cell from among the UE-specific cell set based on small cell-selection parameters, either measured or received by the UE based on the assistance data. The UE can further directly initiate access or handover of itself to the selected, first small cell. A transmitter component of the UE can transmit an access request message or a handover request message to direct the access or handover operation with the selected first small cell. Additional aspects and details of the disclosure are further described below with reference to figures.

Referring to FIG. 1, illustrated is an example of a wireless network platform 100 that provides communication services to a UE device 120 within a communication network in accordance with various aspects being described. A wireless network platform 100 can comprise one or more macro cells 102 (e.g., long term evolution (LTE) technology) that can be generated by a macro cell network device 108 (e.g., base station, access node, eNodeB, eNB or similar device) as a network coverage zone or wireless network for one or more user equipment (UE) devices 120, and one or more small cells generated by small cell network devices 110-118. Efficient cell association, handover, and radio link recovery processes can be performed by the platform 100 as a macro cell assisted small cell network. The UE device 120, the macro cell network device 108 and the small network devices 110-118 can operate to reduce the handover failure rate, interruption time, and power consumption of these network devices by enabling the UE 120 to participate in the control of its own access and handover operations.

Among various aspects of this disclosure, cell detection and association procedures for LTE-assisted millimeter wave (mmW) small cells (e.g., provided by small cell network devices 110-118) can be facilitated directly by the UE 120 based on dedicated assistance information. This assistance information can be partially determined by any particular network device, including the UE 120, the macro cell network device 108, any of the small cell network devices 110-118 or a combination thereof. The assistance information can be further shared among these network devices to enable efficient operations, such as from the macro cell network device 108 with the UE 120 while having dual-connectivity with small cells, or with the small cell network devices. The assistance information can be referred to as dedicated assistance information related to the mmW cells or small cells associated with the macro cell 102, which enables cell identification and cell measurement of the small cells within the macro cell 102 by the UE 120, for example. The assistance information can include physical cell identities (PCIs), carrier frequencies, frame timing information, or a cyclic prefix (CP) length, which can be sent by the macro cell network device 108, or from a serving small cell network device 116, to the UE 120, for example.

Based on the assistance information, the UE 120 can operate to generate various measurements to one or more small cells (e.g., provided by small cell network devices 110-118) within the macro cell 102 provided by the macro cell network device 108. The UE 120 can operate to transmit measurement reports related to detected small cells, to the macro cell network device 108 via a lower carrier frequency (LTE interface) or to one of the small cell network devices 110-118, as well as receive related information (e.g., system information corresponding to the small cells, or assistance information for selecting a target cell) from the macro cell network device 108 or one of the small cell network devices 110-118.

The macro cell network device 108, for example, can assist management operations such as connectivity processes including access, handover, beamforming, dual-connectivity (i.e., the UE being connected between a macro cell and a small cell) or other operations with the UE 108 and small cell network devices 110-118, and can also be configured to control connection, access, release, handover operations or other UE network management processes with the UE 120, the small network devices 110-118 within the macro cell 102, the macro cell network device 108 itself, other UEs or network devices. For example, the macro cell network device 108 can determine which small cells are considered candidate small cells 104 to potentially operate as a serving (target) small cell network device or serving eNB (e.g., small cell network device 114) for the UE 120. The UE 120 can then perform its own measurements on small cells with the assistance information from the macro cell network device 108 for determining a subset (UE specific cell set) of the candidate cells and finally a selected target cell. The macro cell network device 108, for example, can determine the assistance information based on any UE location information, UE mobility state estimation, small cell load information, network deployment information, UE measurement reports regarding one or more lower or higher carrier frequency layers, or other data.

As stated above, the UE 120 can generate measurements performed itself or from the assistance data to determine a UE specific cell set 106, which includes a subset (less than all, but at least one) of the candidate small cells 104. The UE 120 can dynamically monitor cells with greater potential for access or handover from the UE specific cell set 106, and select a target cell. For example, the UE 120 can select the small cell 122 of a small cell network device 116 among small cells in the UE specific cell set 106 for access or handover. The macro cell network device 108 is able to communicate to the small cell eNBs (e.g., small cell network devices 114, 116) in the UE specific cell set 106 via an X2 interface, such as for UE context information or other data to prepare the small cell network devices for potential access or handover operation based on a selection of a small cell by the UE 120 from among the UE specific cell set 106 or of the UE specific cell set 106.

The UE specific cell set 106, for example, can comprise an optimal set of cells within the candidate small cells 104 for the UE 120 to access, wherein the optimal set of cells are selected based on uplink and/or downlink measurement data and the candidate small cells are based on location or mobility state of the UE 120, and/or access/load data of the small cell network devices 110-118. For example, the candidate cells 104 can satisfy a first threshold from among all small cells within the macro cell 102, while the UE specific cell set can satisfy an additional threshold or have a higher ranking with respect to one or more parameters. Additionally, the macro cell network device 108 or the UE 120 can operate to determine the small cells 104 that are candidates or as UE-specific cell set 106. For example, the macro cell network device 108 can provide the candidate cells 104 along with the assistance data, or only provide assistance data related to these candidates to the UE 120, which can further determine the UE specific cell set 106. The UE 120 can further facilitate its own target cell for handover or access based on measurements of the UE specific cell set 106, for example.

Further, the macro cell network device 108 can also receive an indication of the UE specific cell set 106 from the UE 120 and communicate the data via the macro cell so that each small cell network device within the subset can update its data, such as with a resource allocation (e.g. a random access or polling resource), an identification data (UE context information) related to the UE 120, a neighbor cell list, or the like. The macro cell network device 108 can also update resource data (e.g., assistance data, network device/UE parameters, access/load data, candidate device list data, UE specific cell set, etc.) for the UE 120 at each of the small cell network devices of the UE specific cell set 106.

The macro cell network device 108, or one or more small cell cluster heads (e.g., a lead or managing small cell device of a particular cluster 110-118 of FIG. 1) can further manage UE polling resources (e.g. time/frequency radio resource and preamble sequence), and inform UE's candidate cells, directly or via dissemination among each cluster with a network device considered a candidate 104, of the selected polling resource for the UE 120, such as at 210, or other small cell network devices within a specific cluster 110-118. In this case, a polling resource can be either for schedule-based polling signal transmission or for contention-free random access-type transmission (e.g., statistical time division multiplexing or the like). Alternatively, the candidate small cells 104 can perform blind detection of UE polling signal only with the knowledge related to a set of time/frequency radio resources and preamble sequences used for contention-based polling signal transmission.

Alternatively or additionally, the UE 120, the macro cell network device 108 or any of the small cell network devices 110-118 can operate via similar processes described above to facilitate access or handover with the UE 120 and the small cell network devices 110-118. For example, the UE 120 can select the target small cell network device 114, and initiate access or handover by notifying the macro cell network device 108 and the small cell network device 114 of the selection. In addition, a small cell network device (e.g., 114) can also acquire or determine assistance information on neighbor small cell network devices 110-118, and further share such information with the macro cell network device 108 or the UE 120 for also the selection of a candidate device, a UE-specific cell set device, or a target small cell network device, for example.

Within the cellular network platform 100, the small cell network devices 110-118 generate corresponding small cells, illustrated as circling each small cell network device 110-118. The small cell network comprising one or more small cells, for example, can operate at frequencies of at least 1 GHz to about 6 GHz or greater, with providing wireless coverage zones or small cells to one or more UEs 120. These small cell network devices 110-118 can generate corresponding small cells that cover a smaller zone or area and use lower powered radio access nodes as compared to the macro cell network device 108 or other radio access nodes. The small cell network devices 110-118, for example, can comprise femto cell network devices, micro cell network devices, pico cell network devices, or other kinds of network devices that generate a smaller coverage zone than the macro cell 102 and operate with additional small cell network devices for handover operations in a heterogeneous network supporting dual-connectivity or carrier aggregation.

In addition, small cell network devices 110-118 can generate small cells for communications in high frequency ranges such as for mmW networks, which can operate at millimeter wavelengths in a carrier frequency range of about 30 GHz to 100 GHz, for example. The small cells can utilize frequency spectrums at high frequency bands (HFB), where, for example, frequency ranges from 1 GHz to 4 GHz and up, to about 100 GHz or greater.

A cluster of densely deployed small cells provided by the small cell network devices 110-118 can operate for transmission and reception based on ideal backhaul links by using a cluster identification that identifies the particular cluster such as with a same physical cell identity (PCI). Identification of the clusters can be further utilized by the network devices (e.g., macro cell network device 108, a small cell network device or the UE 120) within the macro cell 102 to reduce signaling overhead and service interruption from frequent handovers. For example, the small cell network devices 110 can have one PCI being shared in common among one another to identify each of the small cell network devices as part of a same cluster from clusters of other small cell network devices 112, 114, 116 or 118, respectively. In addition, a cluster head or managing small cell network device within each cluster can operate to disseminate and share information related to the UE 120 for access and handover within each cluster. Further, the managing or cluster head network device can be dynamically changed in relation to the UE 120 for a given UE, so that any network device labelled as 116, for example, could operate or function as a cluster head device for the network devices 116 having the same PCI or other identifying parameter.

In another aspect, the candidate small cells 104 can be a group of small cells 104 that could comprise a subset or less than all of the small cells provided by the small cell network devices 110, 112, 114, 116, 118 within the coverage zone 104 of the macro cell network device 108. The candidate small cells 104 can be identified by the macro cell network device 108, the UE 120, a particular small cell network device within the macro cell 102 or other network device (e.g., a cluster head/manager of a group of small cell network devices). For example, the macro cell network device 108 can be configured to identify each cluster of small cell network devices as subsets of the small cell network devices within the macro cell 102, as well as particular network devices of the clusters whose small cell clusters satisfy a threshold parameter as candidate network devices (e.g., small cell network devices 114, 116, 118). Each of the clusters 110-118 can have a number (one or more) of small cell network devices identified or classified within each cluster according to one or more similar characteristics or parameters among one another (e.g., PCI or other operating parameters such as location, distance, identification tag, etc., relative to one another or the UE 120).

An identification of the small cell network devices 110-118, the candidate small cells 104, small cell network device clusters 110-118, or candidate clusters of small cell network devices 114, 116, and 118 can be also based on one or more parameters, or cell parameters. The candidate small cells 104 can be identified, for example, based on a set of parameters or criteria that satisfy a predetermined threshold or a ranking from among all of the small cells being detected or within the macro cell 102. These parameters for identification of small cells can also be considered as cell-selection parameters as discussed herein to determine one or more small cells (e.g., small cell 122) within the macro cell 102 for an access or a handover operation with the UE 120. The parameters can include data related to the UE device 120, the macro network device 108, the small cell network devices 110-118, connections or Quality of Service (QoS) between the network devices.

In one aspect, one or more of the cell-selection parameters can be measured by the UE device 120, the macro cell network device 108, or any one of the small cell network devices 110-118 in order to generate, identify or determine a data set comprising one or more candidate small cells 104, a UE-specific cell set 106 from among the candidate small cells 104, or a small cell network device from among the UE-specific cell set 106 for an access or handover operation. These cell-selection parameters can include UE location information within the macro cell 102. This UE location information can be rough or approximate UE location information such as a geographical data, for example, based on a satellite position system similar to a global position system (GPS), Galileo or other geographical positioning system. Location information can be based on the connections, communications, distances, or other characteristic of the UE 120 or network devices 108-118.

In other aspects, cell-selection parameters can further include mobility information of the UE 120 or a network device within the network 104, which can be determined by the UE 120, the macro cell network device 108, or a small cell network device 110-118. Such mobility information can comprise data related to acceleration, direction, speed, power, network signalling, or network related data that can be used to determine movement or mobility information pertaining to the UE 120 or a network device of the wireless network platform 100.

In addition, cell-selection parameters can include load data, a network device congestion data, access data of a device or any other UE sensed or network related data that can be used to determine network device congestion or resource availability, for example. The cell-selection parameters can include access or load data of the small cell network devices 114, 116 of the UE-specific cell set 106 or the candidate small cells 104, for example. The load data can include a congestion data such as a number of connections each small cell network device has, or one or more neighbor relations, for example, as a part of a set of network conditions as parameters also. For example, a network bandwidth available for a small cell network device, traffic monitoring data, network offloading, network preloading, or other conditions can also be part of the cell-selection parameters. In one example, cell-selection parameters can also include a link quality or QoS of a first small cell (e.g., small cell 122), or a change (increase or decrease) in a number of small cells with a link quality satisfying a predetermined threshold within the UE-specific cell set 106.

In one example, cell-selection parameters can be based on a downlink measurement, an uplink measurement, an access/load datum of the candidate small cells, or other parameters. A downlink measurement, for example, can be based on a cell-specific reference signal or a UE-specifically beam-formed synchronization signal. A small cell network device 116 of small cell 122, the macro cell network device 108, or the UE 120 can determine one or more cell-selection parameters via data from a connection channel through a corresponding source small cell 122 or the macro cell 102 that serves the UE device 120. Cell-selection parameters can be determined by the UE device 120, the connected (source) small cell network device 116, the macro cell network device 108, a target small cell network of device 114 of the UE specific cell set 106, or other network device of the network platform 100, and made available to the UE 120 through the macro cell 102 or a small cell 122 associated with the macro cell 102.

In one example, the macro cell network device 108 can determine one or more cell-selection parameters to update the candidate small cells 104 or the UE-specific cell set 106 for the selection of a target small cell network for access or handover by the UE 120. The macro cell network device 108 can utilize network deployment data, UE mobility state estimation or mobility data, or other cell-selection parameter data to identify or update the candidate small cell network devices 104 or the UE-specific cell set 106, for example. The macro cell network device 108 can provide this information to the UE 120 as part of the assistance information for the UE 120 to initiate access or handover operations based on this data. In response to receiving the data, the UE 120 can select a target small cell network device to access or handover to, and select which small cells meet a threshold to qualify as candidate small cells 104 or as part of UE-specific cell set 106.

In addition, the small cell network devices 110-118 can each determine a set of neighbor relations and maintain measured cell-selection parameters according to the updated list or set of neighbor small cells. The neighbor cells can include small cells in the same cluster connected with extreme low latency backhaul links (e.g., with the same PCI), the UE-specific cell set 106, the candidate small cells 104, other small cells or the like. Small cell network devices can share data with the UE 120, the macro cell network device 108 or one another as assistance information. The UE 120 can then utilize the information on the network it is connected to in order to select a target small cell for access or handover, or to identify/update the set of candidate small cells 104 or the UE-specific cell set 106 based on a higher threshold or ranking for one or more parameters/measurements.

Downlink measurement data can be determined by the UE 120 for the source small cell 122 of device 116 or other potential target small cells. The downlink measurement can be based on a cell-specific reference signal or on a UE-specifically beam-formed downlink synchronization signal (SS). To generate uplink measurement data, the UE 120 can periodically transmit a beam-formed uplink sounding reference signal (SRS), for example.

Additionally, a UE polling based cell detection method and related physical channel can be used for macro cell assisted HFB small cell operation, wherein the macro cell network device 108 can use a low frequency band (LFB) RAT such as LTE. Configurations related to UE polling signals can be managed by a management entity or other component via the macro cell network device 108 and be communicated with one or more small cell network devices of the candidate small cells via backhaul links, for example. The UE 120 can generate polling operations to determine the cell-selection parameters, and then share the information with other network devices, such as the macro cell network device 108 or a small cell network device 110-118 for implementing an access or handover operation. In response to the UE 120 polling signals, the small cell network devices 114 and 116 of the UE specific cell set 106 can return polling response messages to the UE 120.

The UE 120 can utilize the polling response messages from the UE specific cell set 106 to generate measurement data or cell selection parameters for determining a target small cell network device 116. The cell-selection parameters can include data which are obtained from an uplink measurement and delivered via a polling response message, for example. The polling response message can include up-to-date system information (SI) of the UE-specific cell set 106, UE-specific synchronization signals, uplink timing advance values, uplink resource allocation information, a cell radio network temporary identifier (C-RNTI) or other similar parameters for determining a small cell of the UE-specific cell set 106 to access or target for handover via the UE 120.

In another example, the UE device 120 can periodically transmit a polling signal with a first period to the UE-specific cell set 106 and with a second period to the set of candidate small cells 104 to determine an uplink measurement for one or more cell-selection parameters. In one aspect, the first period can be shorter than the second period. With a longer period, the UE 120 can omni-directionally transmit a UE polling signal to the set of candidate small cell network devices of the candidate small cells 104 or small cells clusters (based on estimated eNB downlink transmit timing) for eNB-side Tx/Rx beam alignment and potential update of the UE-specific cell set 106. With a shorter period, the polling signal can be transmitted to the already determined UE specific cell set 106 for eNB-side Tx/Rx beam alignment, for example. In response to polling signalling, neighbour small cell network devices of the UE-specific cell set 106 can transmit beam formed downlink SS for neighbour cell measurements by the UE 120, as well as UE Tx/Rx beam alignment, for example. The UE 120 polling signal could be much less frequently transmitted compared to the beam formed uplink sounding reference signal, which is used for beam tracking at the serving small cell network device 116, for example. Additionally or alternatively, the UE device 120 can, in response to an event-trigger, transmit a polling signal to the set of candidate small cells 104.

For efficient and effective reception of the polling signals, the macro cell network device 108 can further communicate to the candidate small cell network devices of the candidate small cells 104 with uplink (UL) UE transmit timing that is aligned with an estimated downlink (DL) eNodeB transmit timing. The macro cell network device 108 or a serving small cell network device can also provide an uplink sounding reference signal (SRS) intended for the serving small cell network device with a valid UL transmit timing advance value, or a random access preamble that can be intended for a target small cell network device with an UL transmit timing that is also aligned with an estimated DL receive timing of the intended or target small cell network device.

In response to a network device (e.g., macro cell network 102, a small cell network device, or the UE 108) determining or configuring the UE-specific cell set 106, the network 102 is configured to prepare the corresponding small cell network devices 114, 116 for potential UE handover or initial access, such as with UE context information. For example, the macro cell network device 102 can generate and communicate UE context information (e.g., subscription information, unique identity information, mobility information or other UE related parameters) available to the network devices 114, 116 of the UE-specific cell set 106. Then, the UE 120 is enabled to directly access a selected small cell 122 among the UE-specific cell set 106 via the UE context information at the small cell network device 116 of the selected small cell and according to the UE's small cell measurements.

In another aspect, the macro cell network device 108 can be configured to assign a virtual cell ID or a UE-specific network ID to the small cell network devices 116, 114 of the UE-specific cell set 106 to enable cooperative transmission and reception across different small cell network devices or clusters 116 and 114 to reduce handover signaling overhead among the UE specific cell set 106. The small cell clusters can include one or more small cells that have one or more common criteria, such as a unique identifier, a physical cell identifier, common system information, or other parameters common to a group of small cells, for example. The virtual cell ID or the UE-specific network ID can operate as a protocol that comprises an identity layer for the various small cells to communicate data or sets of data such as UE context information (e.g., UE subscription information, UE identity information, or other UE related parameters), Medium Access Control (MAC) or higher layer status information and configuration, and physical layer configuration, and thereby reduce overhead communications in access or handover operations.

In another aspect, any of the small cells of the candidate cells 104 or of the UE specific cell set 106 can be updated to facilitate efficient and quick access or handover when UE mobility parameters change, for example. In response to the UE device 120 moving from one small cell coverage (e.g., small cell network device 116) to another small cell coverage (e.g., small cell network device 114), as with a handover operation, the set of candidate small cells 104 can be updated by the macro-cell network device 108 or the UE 120. The assistance information, for example, can include the various cell-selection parameters, as discussed above, such as related to network deployment (e.g., access/load information, an uplink measurement, a downlink measurement or the like) and UE mobility state estimation (e.g., acceleration, location, direction, speed, or other UE related mobility data).

In addition, the UE specific cell set 106 or candidate cells 104 can be updated by the macro cell network device 108 or the UE 120 according to access/load data or the cell-selection parameters such as measurements of uplink (UL) signals, UE downlink (DL) signals, UE location data, access/load data or other network parameter data, for example. In response to at least one of small cells in a small cell cluster being included or added into the UE-specific cell set 106, UE context information (enabling access to small cells by the UE 120) can be stored in a cluster head of a cluster of small cell network devices, and be available to all the small cell network devices within the particular cluster, for example, or provided by the macro cell network device 108 to each small cell network device of the UE specific cell set 106.

In another aspect, the UE polling signal intended to form a new UE specific cell set 106 or evaluate the current UE specific cell set 106 among the set of candidate cells 104 can be facilitated or transmitted based on an event trigger basis. The event trigger, for example, can include a degradation (e.g., a connection quality or QoS factor) or other triggering event for an access or handover procedure from one small cell network to another with the assistance of the macro cell network device 108, for example. With a UE polling, an update procedure to update the UE-specific cell set 106 can be initiated in response to a UE serving or neighbor cell measurement indicating a signal or link degradation quality below or not satisfying a threshold, for example.

An advantage of the small cell access and handover procedure includes fast handover and association of the UE 120 in a small cell 122, as the UE 120 can select and access to a serving cell directly instead of sending a measurement report (having one or more of the parameters or criteria) and waiting for a network decision for the access or handover. This can reduce handover failure when the UE 120 suffers from frequent radio link problems and an immediate handover to another small cell network is needed. Additionally, Radio Resource Control (RRC) signaling (e.g., signaling related to a measurement report and a handover command) overhead due to frequent change of a serving small cell device can be reduced. Event-trigger based updates of the UE-specific cell set 106 can handle high mobility UE efficiently without increasing the overhead of UE-polling signal transmission.

Although the UE 120 can select its serving cell based on DL cell measurement, the macro cell 102 or one or more small cells associated with the macro cell can maintain control of the radio resource management by determining the UE-specific cell set 106 (for the UE polling based cell detection procedure) or by configuring a set of parameters and criteria based on which the UE 120 can determine the UE-specific cell set 106 (for the broadcast based cell detection procedure) and a target or serving small cell.

In various embodiments of small cell access (or handover procedures), up-to-date SI for the UE-specific cell set 106 can be available to UE 120 in order for the UE 120 to select and access a small cell within the UE-specific cell set 106 directly. Various aspects for delivering and receiving SI for the UE-specific cell set 106 for the UE 120 can be envisioned.

In one example aspect, before a network device (e.g., macro cell network device 108, or a small cell network device 110-118) or the UE 120 identifies a UE-specific cell set 106, the SI of a set of candidate small cells 104 can be transmitted to the UE 120 from the macro cell network device 108 for initial access or from the serving small cell network device 116 for handover, via a dedicated RRC message (as part of assistance information). If the SI of one or more small cells (e.g., small cells provided by small cell network devices 114-118) within the candidate small cells 104 changes, a dedicated RRC message with updated SI can be transmitted to the UE 120 again from the macro cell network device 108 or from the serving small cell network device 116.

Alternatively or additionally, with UE polling based detection processes, the SI of the UE specific cell set 106 can be sent as part of polling response messages by the small cell network devices 116 and 114 themselves. If SI which has already been sent as part of assistance information is updated, the updated SI can be included in the polling response to the UE 120.

Alternatively or additionally, the macro cell network device 108 can broadcast SI of all small cells under its coverage. The UE 120 can buffer broadcast SI messages for the set of candidate small cells 104 or small cell clusters 114-118 part of the candidates, or all small cell network devices 110-118. A UE buffer component (e.g., buffer component 214 of FIG. 2) can then decode the buffered broadcast SI messages for a selected small cell or small cells cluster after small cell selection by the UE 120 (if small cell selection parameters are not included in broadcasted SI messages, but in the assistance information message). Alternatively, the UE 120 can decode the buffered SI messages for the UE-specific cell set 106 to obtain cell selection parameters, and select a suitable serving or target small cell network based on these decoded cell selection parameters. When the SI is updated, a paging message, for example, from the macro cell network device can be used to inform the UE 120 of a SI change or of updated SI.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 2:
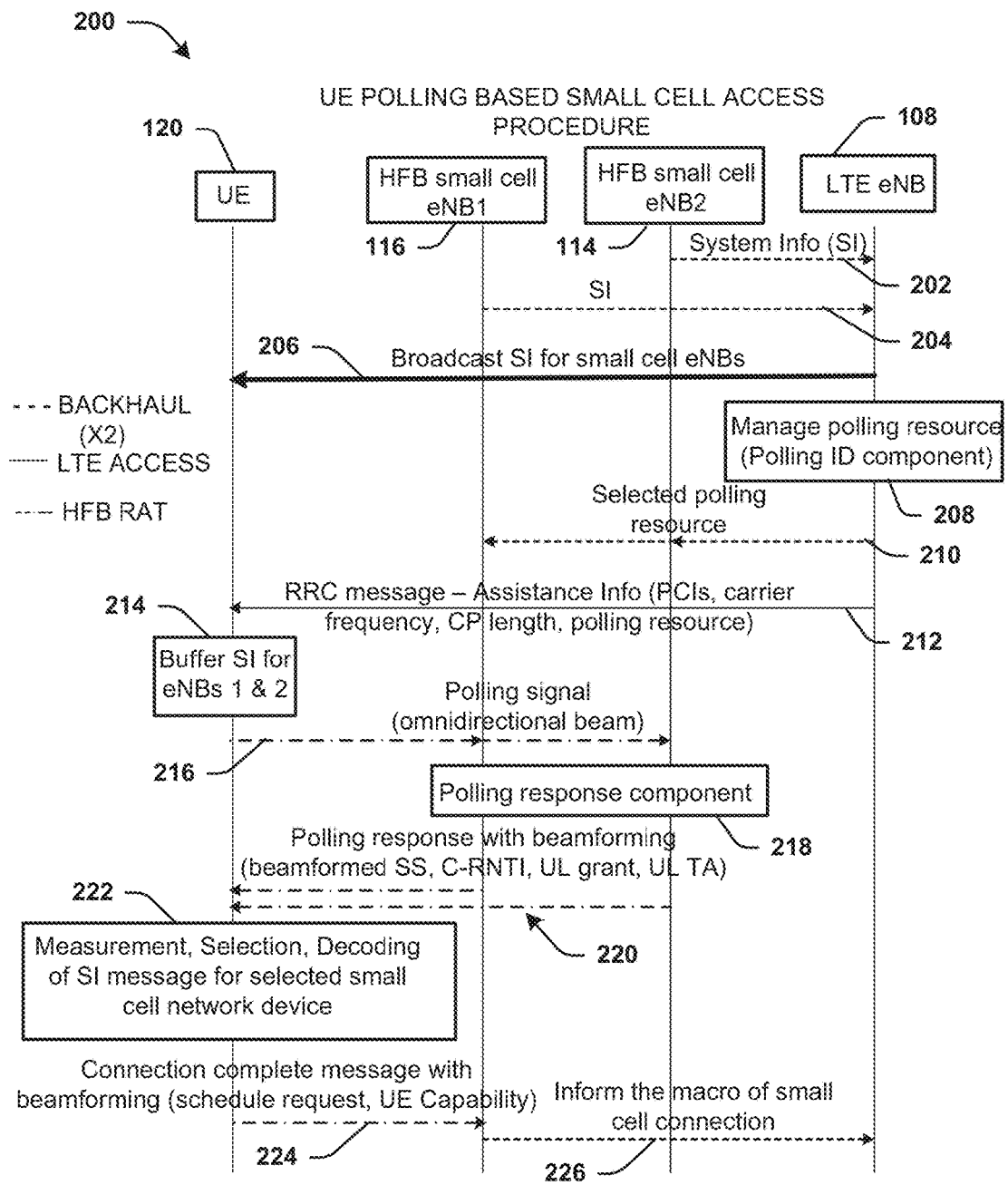
FIG. 2 another data flow illustrating a polling signal based access procedure according to various aspects disclosed.

Referring to FIG. 2, illustrated is an example process flow 200 for a UE 120 to direct access to a small cell within the macro cell 102 of FIG. 1. The disclosed embodiments enable the UE 120 to direct the access process based on assistance data provided by the macro cell. In case of LTE macro cell networks and HFB RAT based small cell networks, using the LTE interface for small cell network handover or association decision and notification can cause longer delay in HFB RAT operations. Considering that HFB RAT systems and LTE systems have different time scales (e.g., about a 100 micro-second sub-frame duration for HFB RAT systems and a 1 milli-second sub-frame duration for LTE systems), small cell addition and removal via LTE can make it difficult to connect to a HFB RAT small cell within a few milliseconds.

In the method 200, system information (SI) of a particular small cell of the UE specific cell set 106 (as illustrated in FIG. 1) can be made available to the UE 120. SI refers to specific data related to a particular small cell that the UE 120 can use to access the particular small cell. The SI can be the same among the small cells of each cluster or different among each cluster. SI, for example, can include common radio resource configurations (e.g., semi-static physical layer parameters, or other configurations or parameters as described in TS 36.331). During an initial access, for example, the UE 120 can acquire the SI of a particular small cell by decoding a Master Information Block (MIB) and/or one or more System Information Blocks (SIBs). During a handover operation, the SI of a target small cell, for example, can be delivered via the macro cell 102 to the UE 120 as a part of a handover command or message. Similarly, SI of secondary serving cell (SCell) can be delivered via a dedicated RRC message in carrier aggregation (CA) or Rel-12 LTE-A dual-connectivity, for example.

With the method 200, the UE 120 operates to directly initiate or determine a particular small cell to initially access according to UE polling processes so that an initial access can occur directly or be facilitated by the UE 120. The initial access is directed by the UE 120 based on assistance information from the macro network device 108 within a heterogeneous network comprising small cells and associated macro cells. The macro cell network device 108 can provide a primary serving cell (PCell) in a lower frequency band (<6 GHz), for example, than other network devices. The macro cell network device 108 can generate assistance information related to the candidate small cells of mmW small cell network devices 114, 116, or other devices (e.g., small cell network devices 110-118 of FIG. 1) within its coverage. As stated above, the assistance information can be dedicated assistance information related to particular mmW networks within the macro cell's coverage zone 102. The UE 120 is able to use the assistance information to detect and measure data of the small cells within the macro cell 102 for the selection of a target small cell to access.

The method 200 illustrates an example of UE polling based cell detection for the UE 120 to detect, measure and select the target small cell for access. This UE polling based cell detection allows identification of a UE-specific cell set 106 according to data from polling signals and measurements, as well as cell load and access information. UE polling operations further enable the heterogeneous network to prepare the small cell network devices (e.g., small cell network devices 114 and 116) for potential access by the UE 120.

The UE 120 can identify or receive knowledge of particular small cell network devices 114, 116 comprising the UE-specific cell set 106 through the corresponding small cell network devices 114, 116 transmitting UE-specific polling responses to the UE 120. During initial access, the UE 120 can perform small cell measurements on a UE-specific DL synchronization signal (SS), which is transmitted as part of a polling response from the small cell network devices 114, 116. For low latency cell association, small cell network selection is then performed by the UE 120.

At 202 thru 210 in general, the macro cell network device 108 prepares assistance information to provide to the UE 120, which, in turn, directs access based on measurement data with the different small cell network devices 114, 116, clusters of small cell network devices or other small cell network devices within the UE specific cell set 106 or candidate small cells 104. At 202 and 204, the macro cell network device 108 can receive SI data from particular small cell network devices 114, and 116 via corresponding backhaul links. SI enables the UE 120 to access a small cell and comprises specific data related to each particular small cell for access, such as identification data, communication data or other data.

At 202 and 204, the macro network device 108 can receive or communicate requests for the SI to small cell network devices 116, 114 under its network coverage zone 102. Once the SI is received at 202, 204 by the macro cell network device 108, the SI for corresponding small cells can be jointly encoded with SI of the macro cell or can be transmitted separately in one or more new system information blocks (SIB)s. The SI related to the candidate small cells 104 can then be transmitted over dedicated RRC signaling as part of assistance information on candidate small cells, or separately from the assistance information. HFB small cell network devices 114 and 116, for example, at 202 and 204 can communicate common radio resource configurations such as semi-static physical layer parameters or other system information (see, e.g., TS 36.331) to the macro cell network device 108.

At 206, the macro cell network device 108 communicates the SI to the UE 120, such as by broadcasting the SI related to small cell devices 114 and 116 or other small cell network devices under its network coverage via an LTE access. The macro cell network device 108 can operate to broadcast SI related to small cell devices within the macro cell coverage zone 102, only selected candidate small cells 104, or the UE specific cell set 106. For example, the macro cell network device 108 can select which small cells provided by small cell network devices 110-118 are candidate small cells 104 or UE specific cell set 106 based on the mobility data, location of the UE or access/load data of the small cells. Based on a predetermined threshold of this data (mobility data, location data, or access/load data), the macro cell network device 108 can communicate SI related to these small cells (e.g., small cells provided by small cell network devices 114 and 116 of the UE specific cell set 106).

In one aspect, via a polling identification (ID) component 208, the macro cell network device 108 can also manage polling resources so that the UE 120 can dynamically update or generate measurements of small cells based on polling signal responses. The polling resources can include, for example, a time-domain radio resource, a frequency-domain radio resource, a preamble sequence or another resource that can be utilized by polling operations via the UE 120.

In addition, the ID component 208 can identify the particular small cell network devices that provide the candidate small cell 104 or the UE specific cell set 106. The size or number of the candidate small cells 104 of FIG. 1, data related to the candidate small cells 104, identification of the small cell network device clusters 110-118, or which clusters or devices are candidates for access relative to the UE 120, for example, can be determined as part of polling resources, based on UE location, access/load data of the particular small cell network devices within a proximity of the UE 120, or UE mobility data. For example, a larger set of candidates could be determined where UE mobility is high and vice versa. Such UE mobility data can include an acceleration data, position information, a direction, a speed or other mobility parameter that is related the UE 120. The macro cell network device 108 can utilize this mobility data to determine which small cell network devices qualify as candidates for access or handover of the UE 120 based on a predetermined threshold of the UE mobility.

Further, the ID component 208 could monitor the QoS of each small cell related to the UE 120, as well as the access/load data of each. The ID component 208 could operate to update a candidate list of candidate small cells 104 or the UE specific cell set 106 accordingly. For example, changes in the access/load data could cause a small cell provided by the small cell network device 114 to be excluded from the UE specific cell set 106 or the candidate cells 104, even though a location of the small cell network device relative to the UE 120 may satisfy a threshold level or QoS level.

At 210, the macro cell network device 108 communicates selected polling resources (e.g., time/frequency radio resources, a preamble sequence or the like) to the candidate small cell network devices or the small cell network devices of the UE specific cell set 106. This communication can indicate which particular small cell network devices (e.g., small cell network device 114) are designated as candidate devices, or as UE specific cell set devices, in order for each to prepare for measurements by the UE 120, and selection by the UE for access or handover, based on which corresponding small cells are configured with a polling resource. Further, the selected polling resources can enable the particular small cell network devices to respond to the UE 120 in response to receive a polling signal, for example. A polling resource can be either for schedule-based polling signal transmission or for contention-free random access-type transmission (e.g., orthogonal code division multiplexing together with statistical time division multiplexing or the like). Alternatively, the candidate small cells 104 or the UE specific cell set 106 can perform blind detection of UE polling signal only with the knowledge related a set of time/frequency radio resources and preamble sequences used for contention-based polling signal transmission.

At 212, the assistance information is communicated by the macro cell network device 108 to the UE 120. SI of secondary serving cells (SCell), candidate small cell network devices 104 or the UE specific cell set 106, for example, can be transmitted over dedicated RRC signaling as part of assistance information related to the candidate small cells 104 or the UE specific cell set 106. The assistance information can include PCIs, carrier frequencies, frame timing information, or a cyclic prefix (CP) length, which can be sent by the macro cell network device 108, or from a serving small cell network device 116. The assistance information can be determined by the macro cell network device 108 or by the serving small cell network device 116 and communicated to the UE 120 via a dedicated RRC message. The UE 120 can receive and utilize the assistance information for further measurement of small cells within the UE specific cell set, and further select a target small cell for an initial access or a handover operation. At 212, for example, the macro small cell network device 108 can transmit the assistant information related to the candidate small cells 104 via a dedicated RRC message. The assistant information can further include polling resources and polling response configurations for the UE 120 to perform further operations, such as measurement, cell selection and decoding of SI for the selected cell network device.

A buffering component at 214 of the UE 120 can be configured to buffer SI for the candidate small cells 104, the UE specific cell set 106 or the cluster head devices of one or more small cell network device clusters 114, 116. This SI enables the UE 120 to access a target small cell device 114 or small cell network devices of a particular cluster, for example. Additionally, the buffering component 214 can buffer the assistance information, in order to be decoded subsequently when an access or handover is triggered by the UE 120 based on a parameter or condition of the network changing (e.g., a lower QoS, a measurement of the DL or UL, a UE mobility factor, a UE location, or other network parameter).

At 216, the UE 120 can transmit polling signals using the polling resources indicated to the small cell network devices 114, 116, and thus trigger polling responses from the determined UE-specific cell set 104 (e.g., small cell network devices 114 and 116). The small cell network devices 114 and 116 comprise a polling response component 218 that is configured to detect the polling signals from the UE 120. The polling response component 218 of the small cell network devices 114, 116 further performs beam alignment and admission controls to communicate polling responses to the UE 120 in response to, or based on, the polling signals from the UE 120. At 220, the polling responses from each small cell network device 114 or 116 can be communicated on an HFB RAT connection, and include, for example, UE-specifically beam formed DL SS, Cell-Radio Network Temporary Identifier (C-RNTI), UL timing advance value, a UL resource grant, or other resources as part of a polling response message.

At 222, in response to receiving a polling response message, the UE 120 performs cell measurements based on received SS, decodes SI messages for the UE-specific cell set 106, and selects a suitable serving cell (e.g., small cell network device 116) based on the cell measurements by the UE 120 and cell selection parameters indicated in the SI messages. Alternatively, cell selection parameters are sent to the UE 120 as part of the assistance information, and the buffer component 214 of the UE 120 can, after selection of a target small cell, decode the broadcasted SI messages for a selected small cell network device 116 or small cell network device cluster 116, enabling the UE 120 to direct a connection to the selected target small cell.

For measurement of the serving small cell 122, in which the UE 120 is already in connection with, the UE 120 can periodically transmit beam formed SRS to the serving small cell network device 116 (under UL timing synchronization) for the eNB-side Tx/Rx beam tracking. In the DL, the UE 120 can perform measurements on beam formed DL SS, periodically transmitted from the serving small cell network device 116.

In another aspect, the neighbor cell measurements of the UE 120 can be performed both periodically and on an event-trigger basis. For periodic neighbor cell measurements, two periods (long and short) can be configured for polling signal transmissions by the UE 120. With a long period, the UE 120 can periodically and omni-directionally transmit a UE polling signal to the set of candidate small cells or small cells clusters (according to an estimated eNB DL transmit timing, or other transmit timing related parameter) for eNB-side Tx/Rx beam alignment and potential update of the UE-specific cell set 106. With a short period, the polling signal can be transmitted to the already determined UE-specific cell set 106 primarily for eNB-side Tx/Rx beam alignment. In response to periodic polling signal, neighbor small cell network devices (e.g., small cell network device 114 or other network devices) in the UE-specific cell set 106 can periodically transmit beam formed DL SS for neighbor cell measurements by the UE 120 (and for UE Tx/Rx beam alignment). It is expected that the UE polling signal is much less frequently transmitted compared to the beam formed UL SRS, which is used for beam tracking at the serving small cell network device 116, for example.

In addition, the UE-specific cell set 106 can be also updated based on an event-triggered neighbor small cell measurement. For example, the UE 120 can observe or detect degradation in the quality/QoS/QoE of the serving small cell 122, or the UE 120 can detect a decrease in the number of neighbor small cells (e.g., other small cells or corresponding cells within the UE specific cell set 106 or candidate small cells 104) that have a good link quality. The link quality can be detected or observed, for example, based on the satisfaction of a threshold level. For example, the quality can be determined by a serving cell Reference Signal Received Power (RSRP) being below a first threshold, or the number of neighbor cells whose RSRP is less than a second threshold or greater than a third threshold. In response to a link quality or other quality factor, the UE 120 could update the UE-specific cell set 106 and measure parameters of the updated neighbor small cells added to the UE specific cell set 106, while maintaining or eliminating other small cells. A separate polling resource (time/frequency radio resource) can be configured for event-triggered polling signal transmissions, for example, while one or more candidate small cell network devices monitor the event-triggered polling signal transmissions, such as a designated head or managing small cell network device 114 of a cluster of network devices that could be a part of the UE specific cell set 106. One of ordinary skill in the art can appreciate that other small network devices within the candidate cells 104, the macro cell network device 108 or other small cell network devices within the macro cell 102 could operate similarly, for example.

At 224, the UE 120 can send a connection complete message to the target small cell network device 116 or the selected small cell network device 116, which can include scheduling request, a UE capability message, and other UE capability or resource information. The small cell network device 116 that is selected for initial access can then inform the macro cell network device 108 of the connection.

Figure 3:
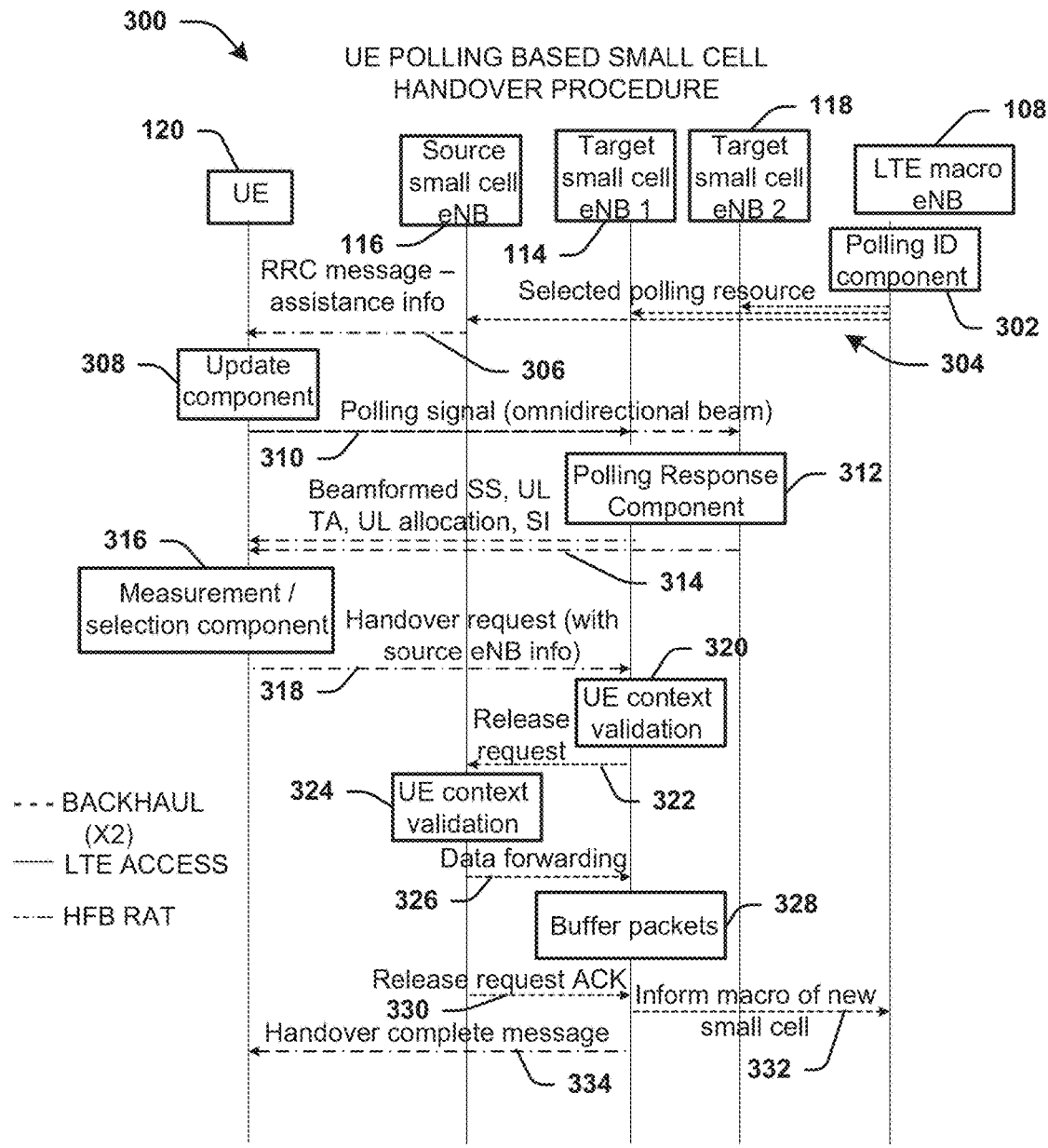
FIG. 3 is a data flow illustrating a polling signal based handover procedure according to various aspects disclosed.

Referring to FIG. 3, illustrated is an example process flow 300 to facilitate handover by a UE 120 within small cells deployed and operated together with a macro cell. In order to handover the UE 120 from a first (source) small cell 116 to a second (target) small cell 114 in an operation mode of LTE-Advanced Rel-12 dual connectivity, for example, the macro cell network device 108 has to be able to release the source small cell network device 116 and add the target small cell network device 114, which can be enabled via an RRC message exchange between the macro cell network device 108 and the UE 120. The disclosed embodiments enable the UE 120 to facilitate and direct an access or handover process based on assistance data provided by the macro cell 102 or small cell therein. In case of LTE macro cell networks and HFB RAT based small cell networks, for example, using the LTE interface for small cell network handover or association decision and notification can cause longer delay in HFB RAT operations. Considering that HFB RAT systems and LTE systems have different time scales (e.g., about a 100 micro-second sub-frame duration for HFB RAT systems and a 1 milli-second sub-frame duration for LTE systems), existing procedures can make it difficult to connect to a HFB RAT small cell within a few milliseconds.

In the method 300, the macro cell network device 108 (e.g., LTE eNB) or one or more small cell cluster heads 114, 116, 118 can manage UE polling resources (e.g. time, frequency, and preamble sequence) via the polling ID component 302, which is similar to the ID component 208 of FIG. 2 discussed above. At 304, the ID component 302 of the cluster head or macro network device 108 informs the UE's candidate cells 114-118 within each cluster of the selected polling resource for the UE 120. Alternatively, the candidate small cell network devices 104 could blindly detect contention-based polling signal transmissions.

At 306, a dedicated RRC message can be transmitted from the serving small cell network device 116. The RRC message can include assistance information as well as SI related to any of the small cell network devices 114-118. The assistance information can be related to identification of the particular candidate small cells 104 or the cells that are determined to be a part of the UE specific cell set 106 from which a target cell is selected by the UE for handover. The assistance information can also include a PCI, carrier frequency, frame timing information, a cyclic prefix (CP) length or other resources, which can be sent from the serving small cell network device 116, or alternatively by the macro cell network device 108.

The UE 120 can receive and utilize the assistance information to generate further measurements of small cell network devices 114-116 within the UE specific cell set 106 or the candidate devices 104. The UE 120 is then able to further select a target small cell device 114 for access or handover based on its own measurement data. The dedicated RRC message can further include polling resources and polling response configurations for the UE 120 to also perform measurements, cell selection and decoding of SI for the selected target small cell network device 114, or the small cell network device 118, if the UE specific cell set has been updated to include the small cell network device 118.

An update component 308 of the UE 120, for example, is configured to update the small cells included in or designated as candidate small cells 104 or the UE specific cell set 106 based on subsequent measurements generated by the UE 120 or via data within the RRC message received. The updating of the candidate cells 104 or the UE specific cell set 106 can be initiated by one or more event triggers. The event trigger, for example, can include a degradation (e.g., a connection quality or QoS factor) or other triggering event for an access or handover procedure from one small cell to another with the assistance of the macro cell network device 108. With a UE polling for small cell detection, an update procedure to update the UE-specific cell set 106 can be initiated in response to a UE serving or neighbor cell measurement indicating a signal or link degradation with quality below or not satisfying a threshold. Different thresholds or different threshold levels can correspond to the candidate cells 104 and the UE specific cell set 106, in which the UE specific cell set 106 could have a higher threshold level for qualification over the candidate small cell devices 104.

At 310, in response to the update component 308 identifying or receiving an event trigger, the UE 120 further transmits one or more UE polling signals via an omnidirectional beam or otherwise. The UE 120 can then update to a new UE specific cell set 106 or further evaluate the current UE specific cell set 106 among the set of candidate cells 104 or the UE specific cell set 106.

At 312, the small cell network devices 114 and 118, as potential target small cell network devices of the UE specific cell set 106 or the candidate small cells 104, can utilize a polling response component 218 to detect the polling signals from the UE 120 and further conduct beam alignment and admission controls to communicate polling responses to the UE 120.

At 314, the UE specific cell set 106 can transmit the beam formed DL SS to the UE 120 as part of a polling response, which can initiate the HO preparation, such as for the target small cell devices 114 or 118 to receive UE context data and reserve resources for the UE 120. Along with the DL beam formed SS, an UL timing advance value and UL resource allocation can be transmitted in the response. SI of the UE-specific cell set can also be transmitted with the beam formed DL SS, if not transmitted as part of the assistance information with the dedicated RRC message.

A measurement/selection component 316 of the UE 120 is configured to perform cell measurements based on received SS, decode SI messages for the UE-specific cell set 106 or the small cell network devices 114 or 118, and select a suitable serving cell (e.g., small cell network device 114) based on the measurements and cell selection parameters indicated in the SI messages. Based on the UE measurements and cell selection parameters, the measurement/selection component 316 determines a HO target small cell network device 114 within the UE specific cell set 106 and communicates an HO request at 318 (e.g., via an HFB RAT connection). The UE 120 sends the HO request message at 318 to the target small cell network device 114 directly using the indicated timing advance (TA) value and UL resource. This communication can include information related to the source small cell 122, and together with the HO request message the UE 120 can request further beamforming training communication exchanging. Because the UE 120 could have a limited number of receiver RF chains, multiple symbols with the same transmit beamforming weights may be utilized to train UE's receive beamforming weights.

A UE context validation component 320 of the target small cell network device 114 can further perform UE context validation. The target small cell network device 114 then transmits a release request 322 to a source small cell network device, which can validate the message at a corresponding UE context validation component 324 and forward data 326 on a backhaul link related to the release and the UE 120 (e.g., on-going user data, MAC layer status data, desired resource data, or like data for servicing the UE 120). The forwarded data 326 can be buffered at 328 by a buffer component 328 and then processed in response to a release request acknowledgement 330 being received. After receiving forwarded data from the source small cell network device 116, the target small cell network device 114 transmits a message 332 to the macro cell network device 108 informing it of the handover and updated serving small cell network device 114 along with a 'handover complete' message 334 being sent to the UE 120.

Barred small cells for the UE 120 or small cells not having sufficient radio resources (e.g., above a threshold) to serve the UE 120 would not respond to the received UE polling signal 310, that is, not transmit UE-specific beam formed SS. Although the UE 120 makes a handover decision, the decision criteria and related parameters for cell association can be set by the network, for example, macro cell network device 108 or a head small cell network device of a cluster within the candidate small cells 104 or the UE specific cell set 104. Thus, network load balancing and offloading can still be achieved.

Figure 4:
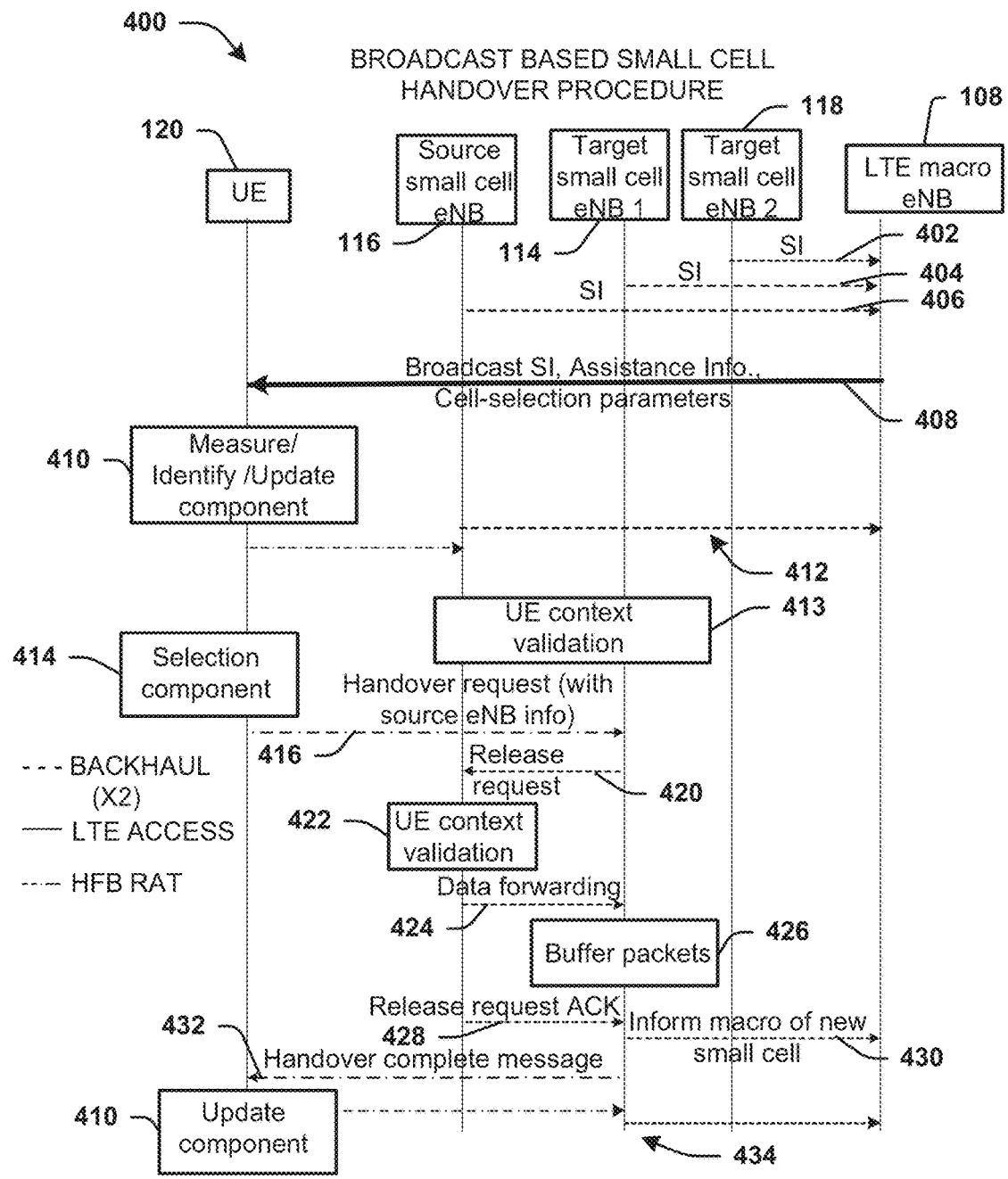
FIG. 4 is a data flow illustrating a broadcast based handover procedure according to various aspects disclosed.

Referring to FIG. 4, illustrated is another example process flow 400 illustrating mobile communication in a macro cell assisted small cell network in accordance with various aspects. The process flow 400 demonstrates an example of broadcast based cell detection for a UE 120 to facilitate access or handover.

At 402, 404, and 406, the macro network device 108 can determine SI related to small cells of small cell network devices 114, 116, 118, as well as for each small cell of small cell network devices 110-118 within the macro cell 102. The SI for small cells can be jointly encoded with SI of the macro cell 102 or separately in one or more new system information blocks (SIB)s. HFB small cell network devices 114, 116, 118, for example, at 402, 404, and 406 can communicate common (cell-specific) radio resource configurations such as semi-static physical layer parameters or other system information (see, e.g., TS 36.331) to the macro cell network device 108. As stated above, one PCI and common SI could be used for small cells within the same small cell cluster. The UE 120 can acquire system information of the small cells by decoding at least one of a MIB and SIB, for example.

At 408, the SI related to the candidate small cells can then be transmitted over dedicated RRC signaling along with assistance information on candidate small cells. Alternatively and additionally, the SI related to the small cells of the small cell network devices 110-118 within the macro cell 102 are broadcast separately from the assistance information, via the macro cell 102.

In one aspect, when the UE 120 moves from one small cell coverage to another small cell coverage, the candidate small cells 104 can be updated at an update component 410 with assistance information from the macro cell network device 108 (e.g. via knowledge related to network deployment conditions, UE mobility state estimation, location data, access/load data or other parameters). The macro cell network device 108 can communicate with small cell network devices 110-118 (as shown in FIG. 1) and determine/update those devices, or a UE specific cell set 106 update by measuring the UE's uplink signals, or as illustrated in FIG. 4 the UE measuring downlink reference signals (e.g. a cell specific reference signals).

The macro cell network device 108 can then efficiently and effectively communicate assistance data based on network deployment conditions and UE mobility state estimation data, or other related parameters for basing access or handover operations by the UE 120. The macro cell network device 108 can also provide an uplink sounding reference signal (SRS) intended for a serving small cell network device with a valid UL transmit timing advance value, or a random access preamble that can be intended for a target small cell network device with an UL transmit timing that is also aligned with an estimated DL receive timing of the intended small cell network device.

The cell-selection parameters transmitted at 408 with the assistance information and SI can also include access or load data of the small cells of the UE-specific cell set 106 or the candidate small cells 104. The load data can include a congestion data such as a number of connections each small cell has, or one or more neighbor relations, for example, as a part of a set of network condition parameters also. As discussed above, a network bandwidth available for a small cell, traffic monitoring data, network offloading, network preloading, or other conditions can also be part of the cell-selection parameters.

In the broadcast based cell detection of the process flow 400 of FIG. 4, the cell-specific DL synchronization signal can be periodically transmitted, and the UE-specific cell set 106 can be determined by the measurement/identification/update component 410 of the UE 120 via the UE's DL measurement and small cell association criteria (cell selection parameters). At 412, the UE 120 can then notify the macro cell network devices 108 directly or the serving small cell network device 116 of the UE specific cells set 106, which in turn can notify the macro cell network device 108. Once the UE 120 notifies the macro cell network device 108 of the identified UE-specific cell set 106 via either a link of the macro cell 102 or a link of the serving small cell 122, the UE-specific cell set 106 prepares for potential handover or access at the UE 120's direction.

Although the UE 120 selects its serving small cell network device 116 based on DL cell measurement, the macro cell 102 can control radio resource management and alternatively determine the small cells part of the UE-specific cell set 106 as well (for UE polling based cell detection) or by configuring a set of parameters and criteria based on which the UE determines a UE specific cell set 106 (for broadcast based cell detection, as illustrated in FIG. 4) as a subset (e.g., small cell network devices 114, 116) of the candidate small cell network devices 104.

A UE context validation component 413 of the small cell network devices 114, 116 of the UE specific cell set 106 can receive UE context data from the macro cell network device 108 or from a core network entity, further perform validation of UE context data (e.g., subscription information, unique identity information, mobility information or other UE related parameters), and reserve any resources (e.g., random access preamble, bandwidth, communication data, etc.) for the UE 120. When the UE 120 detects consistent radio link problem on the serving small cell, such as a decrease in a QoS or other degradation below a threshold, or finds a more suitable cell, the UE 120 can make handover decision according to network indicated handover criteria, and access to a target small cell network device 114 (selected from the UE-specific cell set 106) directly. The selection component 414 of the UE 120 can determine a target small cell network device 114 from among the selected UE specific cell set 106 based on measurements and/or the cell selection parameters related to the access/load data, UE mobility or location, for example. The UE 120 communicates an HO request at 416 (e.g., via an HFB RAT connection). The UE 120 sends the HO request message at 416 to the target small cell network device 114 directly using the indicated timing advance (TA) value or UL resource, for example. This communication can include info related to the source cell 122 that together with the HO request message 416 the UE 120 can request further beamforming training communication exchanging.

The target small cell network device 114 can then transmits a release request 420 to the source small cell network device 116, in the case of an HO operation, which can validate the message at a corresponding UE context validation component 422 and forward data in a message 424 on a backhaul link related to the release and the UE 120 (e.g., on-going user data, MAC layer status data, desired resource data, or like data for servicing the UE 120). The forwarded data 424 can be buffered by a buffer component 426, and then processed in response to a release request acknowledgement 428 being received. After receiving forwarded data from the source small cell network device 116, the target small cell network device 114 transmits a message 430 to the macro cell network device 108 informing it of the handover and updated serving small cell network device 114 along with a 'handover complete' message 432 being sent to the UE 120.

In response to the UE 120 newly detecting a neighbor cell with good link quality or further observing a decrease in the number of neighbor cells with good link quality (with a QoS or other quality factor above a predetermined threshold) within the current UE-specific cell set 106, then the UE 120 can update the UE-specific cell set 106 via the update component 410 and informs the network of the change via one or more communications 434 with at least one communication via the small cell network device 114 or the macro cell network device 108.

Figure 5:
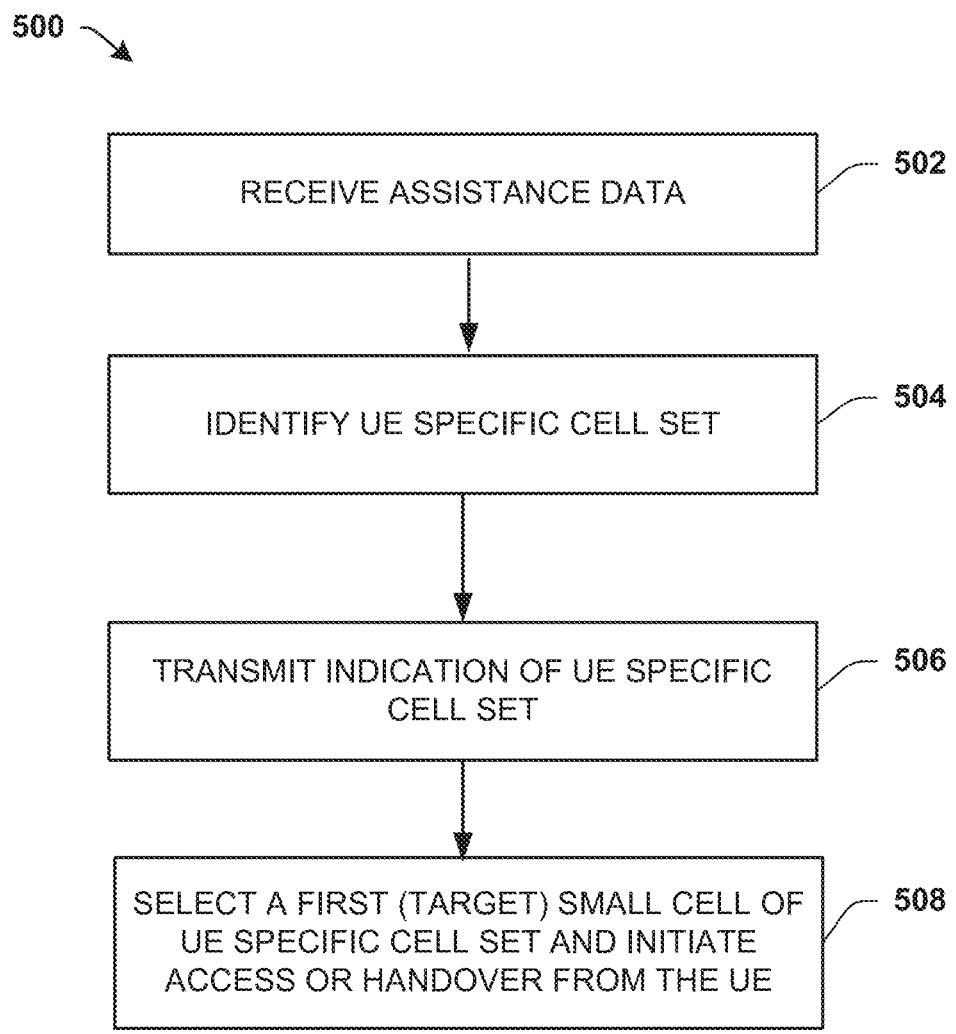
FIG. 5 is a flow diagram illustrating a method for an access or handover procedure according to various aspects disclosed.

Referring to FIG. 5, illustrated is an example method 500 in accordance with various aspects for enabling UE directed access and handover operations within a macro assisted small cell network. At 502, the UE 120 receives assistance data (information) related to small cells provided by small cell network devices 110-118, such as the candidate small cells 104, from the macro cell network device 108 in a heterogeneous network as a macro cell assisted small cell network.

The assistance data can be dedicated assistance information related to the small cells within the macro cell's coverage zone that enables cell identification and cell measurement of the small cells by the UE 120. The dedicated assistance information can include cell-specific parameters based on mobility measurements determined on a serving or neighboring cell. The assistance data, for example, can include one or more cell-selection parameters such as related to network deployment (e.g., access/load information, an uplink measurement, a downlink measurement or the like as related to the UE 120) and UE mobility state estimation (e.g., acceleration, location, direction, speed, or other UE related mobility data). The assistance data can include system information that enables the UE 120 to connect to any given small cell network device, PCIs of clusters or cluster head small cell network devices to be detected, a MIB, an SIB, carrier frequencies, rough (frame) timing information, or other data pertaining to the small cells or corresponding small cell network devices 110-118.

At 504, the UE 120 identifies a UE-specific cell set 106 as a subset of candidate small cell network devices 104 based on the assistance data. The UE 120 can utilize the assistance data to perform or determine measurements and identify the small cell network devices that are optimal for a potential access or handover operation. The macro cell network device 108, for example, can provide the assistance data related to the candidate small cell network devices based on the UE mobility, location, access or load data (e.g., the capacity of a network device relative to a number of UEs being currently serviced or available), or other parameters.

At 506, the UE 120 transmits an indication of the determined UE-specific cell set to facilitate an access operation to, or a handover operation. The small cell network devices can each process UE context information in order to enable connection in case of being selected by the UE 120 for access. In other aspects, the UE 120, the small cell network devices or the macro cell network device can receive the indication of the UE-specific cell set from one or more small cell network devices of the set of candidate small cell network devices, wherein the UE-specific cell set is identified based on an uplink measurement, a downlink measurement, and/or an access load information of the set of candidate small cell network devices by the one or more small cell network devices, for example. Uplink measurements can be based on a UE polling signal, an uplink sounding reference signal, or a random access preamble of the set of candidate small cell network devices, wherein the downlink measurement is based on at least one of a cell-specific reference signal or a UE-specifically beam-formed synchronization signal.

At 508, the UE 120 further selects a first or target small cell network device from the UE-specific cell set based on one or more cell-selection parameters. The cell-selection parameters can include data obtained from an uplink measurement and be sent via a polling response message, for example. The polling response message can include up-to-date system information of the UE-specific cell set 106, UE-specific synchronization signals, uplink timing advance values, uplink resource allocation information, a cell radio network temporary identifier (C-RNTI) or other similar parameters for determining a small cell of the UE-specific cell set 106 to access or target for handover via the UE 120.

The method 500 can further comprise selecting a second small cell from the UE-specific cell set based on the one or more cell-selection parameters. An access request message or a handover request message can be transmitted to the second small cell network device of the second small cell. The UE can then direct the handover operation from the first small cell to the second small cell based on the selected second small cell network device.

In polling based small cell procedures, the UE can receive polling response messages from one or more small cell network devices. The polling response messages can include an up-to-date system data of the UE-specific cell set, a UE-specific synchronization signal, an uplink timing advance value, an uplink resource allocation data, or a cell radio network temporary identifier (C-RNTI), for example. For measurement of neighbor cells' link qualities, the UE 120, for example, can periodically transmit a first UE polling signal that includes a first period to the UE-specific cell set 106 and a second UE polling signal with a second period to the set of candidate small cells 104 to initiate generation of the one or more cell-selection parameters based on an uplink measurement, in which the first period can be shorter than the second period. Alternatively or additionally, the UE polling signal, for example, can be communicated in response to an event-trigger such as a degradation in at least one of a link quality of the first small cell or a decrease in a number of small cells with the link quality satisfying a predetermined threshold within the UE-specific cell. The UE 120 can perform a downlink measurement on the serving small cell by periodically transmitting a beam-formed uplink sounding reference signal (SRS) and receiving a beam-formed downlink synchronization signal (SS).

In a broadcast based cell detection procedure, the UE 120 can perform a downlink measurement on one or more small cells by receiving periodically transmitted synchronization signals and/or cell-specific reference signals. In some deployment scenarios, although link quality of the macro cell 102 degrades, the UE 120 may maintain good link quality on one or more small cells of the UE-specific cell set. The measurement results on the UE-specific cell set 106, for example, can then be communicated in a measurement report on a macro cell frequency layer to the macro cell network device 108 so that the macro cell network device 108 can decide whether to update the UE-specific cell set or the candidate small cell network devices during macro-cell handover.

Figure 6:
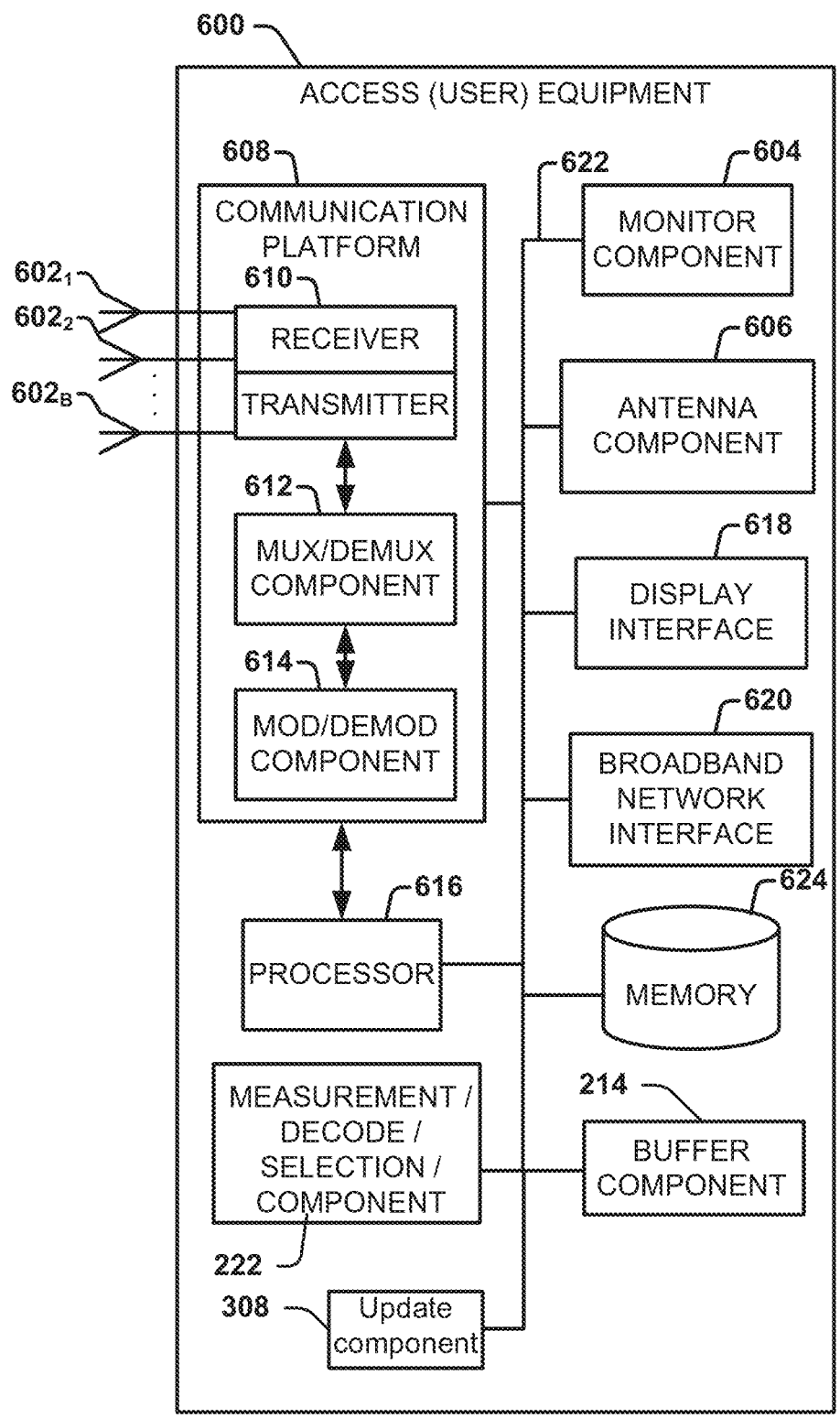
FIG. 6 is an example small cell network device, access point, or user equipment device in accordance with various aspects disclosed.

To provide further context for various aspects of the disclosed subject matter, FIG. 6 illustrates a block diagram of an embodiment of access (user) equipment 600 related to access of a network (e.g., macro cell network device, base station, wireless access point, small cell network device or small cell access point, and so forth) that can enable and/or exploit features or aspects disclosed herein.

Access equipment or UE 600 is another example of UE 120 and related to access of a network can receive and transmit signal(s) from and to wireless devices, wireless ports, wireless routers, etc. through segments $602_1$-$602_B$ (B is a positive integer). Segments $602_1$-$602_B$ can be internal and/or external to access equipment and/or software 600 related to access of a network, and can be controlled by a monitor component 604 and an antenna component 606. Monitor component 604 and antenna component 606 can couple to communication platform 608, which can include electronic components and associated circuitry that provide for processing and manipulation of received signal(s) and other signal(s) to be transmitted.

In an aspect, communication platform 608 includes a receiver/transmitter 610 that can convert analog signals to digital signals upon reception of the analog signals, and can convert digital signals to analog signals upon transmission. In addition, receiver/transmitter 610 can divide a single data stream into multiple, parallel data streams, or perform the reciprocal operation. Coupled to receiver/transmitter 610 can be a multiplexer/demultiplexer 612 that can facilitate manipulation of signals in time and frequency space. Multiplexer/demultiplexer 612 can multiplex information (data traffic and control signaling) according to various multiplexing schemes such as time division multiplexing, frequency division multiplexing, orthogonal frequency division multiplexing, code division multiplexing, space division multiplexing. In addition, multiplexer/demultiplexer component 612 can scramble and spread information (e.g., codes, according to substantially any code known in the art, such as Hadamard-Walsh codes, Baker codes, Kasami codes, polyphase codes, and so forth).

A modulator/demodulator 614 is also a part of communication platform 608, and can modulate information according to multiple modulation techniques, such as frequency modulation, amplitude modulation (e.g., M-ary quadrature amplitude modulation, with M a positive integer); phase-shift keying; and so forth).

The UE 600 related to access of a network also includes a processor 616 configured to confer, at least in part, functionality to substantially any electronic component in access equipment and/or software 600. In particular, processor 616 can facilitate configuration of the UE 600 through, for example, monitor component 604, antenna component 606, and one or more components therein. Additionally, the UE 600 can include display interface 618, which can display functions that control functionality of access equipment and/or software 600, or reveal operation conditions thereof. In addition, display interface 618 can include a screen to convey information to an end user. In an aspect, display interface 618 can be a liquid crystal display, a plasma panel, a monolithic thin-film based electrochromic display, and so on. Moreover, display interface 618 can include a component (e.g., speaker) that facilitates communication of aural indicia, which can also be employed in connection with messages that convey operational instructions to an end user. Display interface 618 can also facilitate data entry (e.g., through a linked keypad or through touch gestures), which can cause access equipment and/or software 600 to receive external commands (e.g., restart operation).

Broadband network interface 620 facilitates connection of the UE 600 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 620 can be internal or external to UE 600, and can utilize display interface 618 for end-user interaction and status information delivery.

Processor 616 can be functionally connected to communication platform 608 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 616 can be functionally connected, through data, system, or an address bus 622, to display interface 618 and broadband network interface 620, to confer, at least in part, functionality to each of such components.

In UE 600, memory 624 can retain location and/or coverage area (e.g., macro sector, identifier(s)) access list(s) that authorize access to wireless coverage through access equipment and/or software 600, sector intelligence that can include ranking of coverage areas in the wireless environment of access equipment and/or software 600, radio link quality and strength associated therewith, or the like. Memory 624 also can store data structures, code instructions and program modules, system or device information, code sequences for scrambling, spreading and pilot transmission, access point configuration, and so on. Processor 616 can be coupled (e.g., through a memory bus), to memory 624 in order to store and retrieve information used to operate and/or confer functionality to the components, platform, and interface that reside within access equipment and/or software 600.

In addition, the UE 600 can further comprise the measurement/decode/selection/update component 222 configured to operate as a control component 222 in one component or as separate components respectively. For example, control component 222 can be configured to measure cell-selection parameters based on the assistance information, and identify a UE-specific cell set 106 from among candidate small cells 104. The UE-specific cell set can be identified or selected from an uplink measurement based on a UE polling signal from transceiver (transmitter) or communication component 610, an uplink sounding reference signal, or a random access preamble. Measurements and selection can also be generated from a downlink measurement based on a cell-specific reference signal or on a UE-specifically beamformed synchronization signal.

The buffer component 214 is configured to buffer a broadcast system information (SI) message of the candidate small cells transmitted via a macro cell covering the candidate cells. The control component 222 is further configured to decode the broadcast SI message to select the UE-specific cell set or the first small cell from the UE-specific cell set.

Figure 7:
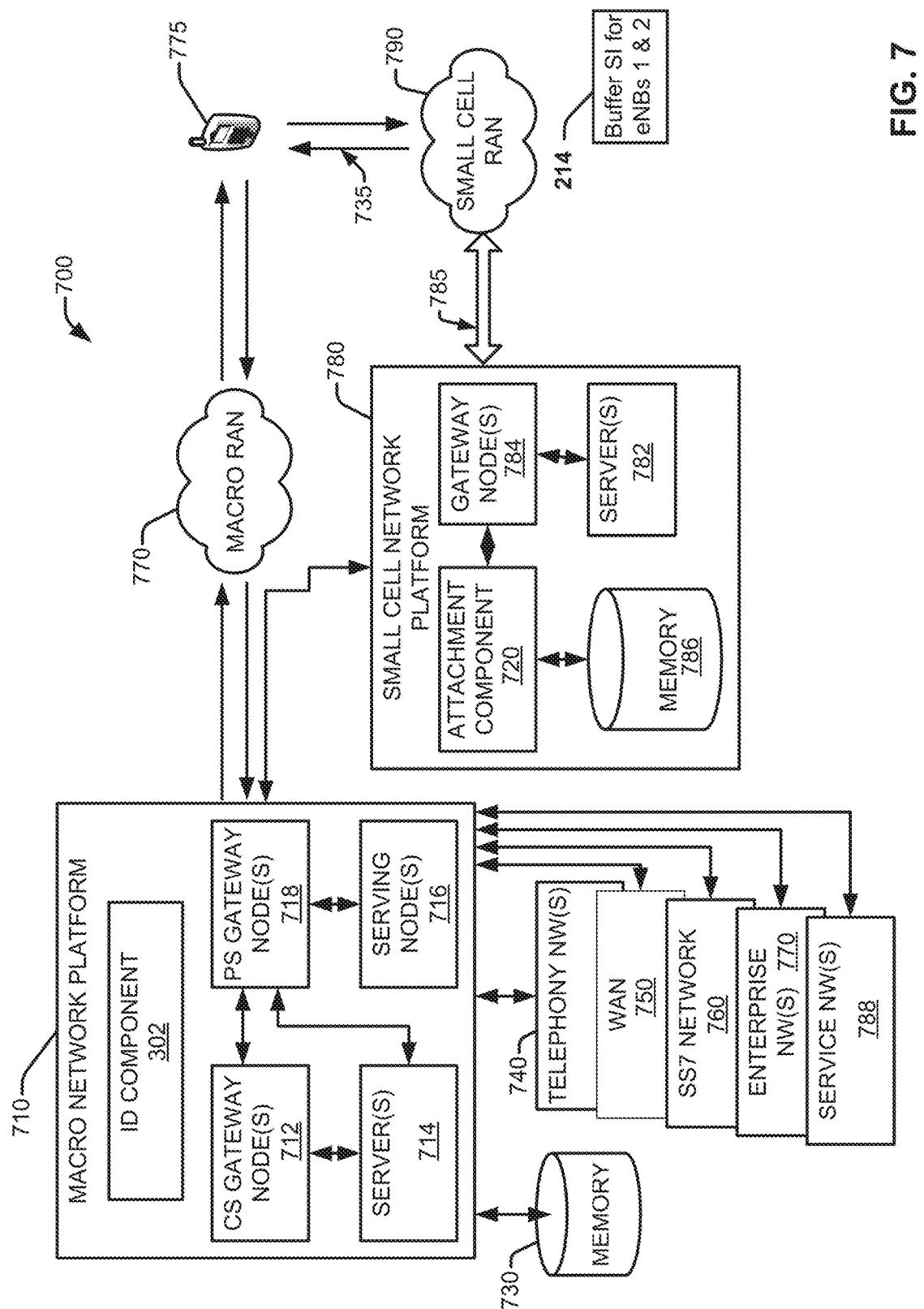
FIG. 7 is an illustration of an example wireless network platform to implement various aspects disclosed.

With respect to FIG. 7, wireless communication environment 700 includes two wireless network platforms: (i) A macro network platform 710 which serves, or facilitates communication with user equipment 775 (e.g., UE 120) via a macro radio access network (RAN) 770 via a macro cell network device (e.g., macro cell network device 108). It should be appreciated that in cellular wireless technologies (e.g., 3GPP UMTS, HSPA, 3GPP LTE, 3GPP2 UMB, 4GPP, etc.), macro network platform 710 is embodied in a Core Network. (ii) A small cell network platform 780, which can provide communication with UE 775 through a RAN 790, which is linked to the small cell network platform 780 via backhaul pipe(s) 785 (e.g., backhaul link(s)). It should be appreciated that macro network platform 710 can operate to assist the UE 775 in self-directed access or handover operations as disclosed by aspect described herein.

It is noted that RAN includes base station(s), or access point(s), and its associated electronic circuitry and deployment site(s), in addition to a wireless radio link operated in accordance with the base station(s). Accordingly, macro RAN 770 can comprise various coverage cells such as macro cell 102, while a small cell RAN 790 can comprise multiple small cell access points such as small cell network devices 110-118 or clusters of mmW devices that can also be connected to the macro cell network device and the UE 775. Deployment density in small cell RAN 790 is substantially higher than in macro RAN 770.

Generally, both macro and small cell network platforms 710 and 780 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 710 includes CS gateway node(s) 712 which can interface CS traffic received from legacy networks like telephony network(s) 740 (e.g., public switched telephone network (PSTN), or public land mobile network (PLMN)) or a SS7 network 760. Circuit switched gateway 712 can authorize and authenticate traffic (e.g., voice) arising from such networks. Additionally, CS gateway 712 can access mobility, or roaming, data generated through SS7 network 760; for instance, mobility data stored in a VLR, which can reside in memory 730. Moreover, CS gateway node(s) 712 interfaces CS-based traffic and signaling and gateway node(s) 718. As an example, in a 3GPP UMTS network, PS gateway node(s) 718 can be embodied in gateway GPRS support node(s) (GGSN).

In addition to receiving and processing CS-switched traffic and signaling, PS gateway node(s) 718 can authorize and authenticate PS-based data sessions with served (e.g., through macro RAN) wireless devices. Data sessions can include traffic exchange with networks external to the macro network platform 710, like wide area network(s) (WANs) 750, enterprise networks (NW(s)) 770 (e.g., enhanced 911), or service NW(s) 788 like IP multimedia subsystem (IMS); it should be appreciated that local area network(s) (LANs), which may be a part of enterprise NW(s), can also be interfaced with macro network platform 710 through PS gateway node(s) 718. Packet-switched gateway node(s) 718 generates packet data contexts when a data session is established. To that end, in an aspect, PS gateway node(s) 718 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 714. It is to be noted that in 3GPP UMTS network(s), PS gateway node(s) 718 (e.g., GGSN) and tunnel interface (e.g., TTG) comprise a packet data gateway (PDG).

Macro network platform 710 also includes serving node(s) 716 that convey the various packetized flows of information, or data streams, received through PS gateway node(s) 718. As an example, in a 3GPP UMTS network, serving node(s) can be embodied in serving GPRS support node(s) (SGSN).

As indicated above, server(s) 714 in macro network platform 710 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 710. Data streams can be conveyed to PS gateway node(s) 718 for authorization/authentication and initiation of a data session, and to serving node(s) 716 for communication thereafter. Server(s) 714 can also effect security (e.g., implement one or more firewalls) of macro network platform 710 to ensure network's operation and data integrity in addition to authorization and authentication procedures that CS gateway node(s) 712 and PS gateway node(s) 718 can enact. Moreover, server(s) 714 can provision services from external network(s), e.g., WAN 750, or Global Positioning System (GPS) network(s), which can be a part of enterprise NW(s) 780. It is to be noted that server(s) 714 can include one or more processor configured to confer at least in part the functionality of macro network platform 710. To that end, the one or more processor can execute code instructions stored in memory 730, for example.

In example wireless environment 700, memory 730 stores information related to operation of macro network platform 710. Information can include business data associated with subscribers; market plans and strategies, e.g., promotional campaigns, business partnerships; operational data for mobile devices served through macro network platform; service and privacy policies; end-user service logs for law enforcement; and so forth. Memory 730 can also store information from at least one of telephony network(s) 740, WAN 750, SS7 network 760, enterprise NW(s) 770, or service NW(s) 780.

Regarding small cell network platform 780, it includes a small cell gateway node(s) 784, which have substantially the same functionality as PS gateway node(s) 718. Additionally, gateway node(s) 784 can also include substantially all functionality of serving node(s) 716. Disparate gateway node(s) 784 can control or operate disparate sets of deployed small cell access points (or small cell network devices), which can be a part of RAN 790. The gateway node(s) 784 can aggregate operational data received from deployed access points (APs), the UE 775 or the macro network. Moreover, gateway node(s) 784, can convey received attachment signaling to attachment component 720. It should be appreciated that while attachment component is illustrated as external to gateway node(s) 784, attachment component 720 can be an integral part of gateway node(s) 784. Various interface components detailed supra in accordance with various aspects can be used to interact with the aforementioned nodes.

Attachment component 720 can facilitate small cell-to-small cell, macro cell-to small cell, and small cell-to-macro cell handover with attachment to a small cell AP dictated in accordance with the selection of a small cell network device (e.g., device 116) of the UE 775 based on assistance information. Memory 786 can retain additional information relevant to operation of the various components of small cell network platform 780. For example, operational or system information that can be stored in memory 786 can comprise, but is not limited to, subscriber intelligence; contracted services; maintenance and service records; small cell configuration (e.g., devices served through small cell RAN 790; authorized subscribers associated with one or more deployed small cell APs); service policies and specifications; privacy policies; add-on features; UE context information; a polling resource; cell selection parameters and so forth.

Server(s) 782 have substantially the same functionality as described in connection with server(s) 714. In an aspect, server(s) 782 can execute multiple application(s) that provide service (e.g., voice and data) to wireless devices served through RAN 790. Server(s) 782 can also provide security features to the small cell network platform 780. In addition, server(s) 782 can manage (e.g., schedule, queue, format . . . ) substantially all packetized flows (e.g., IP-based, frame relay-based, ATM-based) it generates, in addition to data received from macro network platform 710. Furthermore, server(s) 782 can effect provisioning of small cell service, and effect operations and maintenance. It is to be noted that server(s) 782 can embody provisioning server, and can populate candidate lists of candidate small cells relative to the UE 775 or UE specific cell sets in accordance with aspects described herein. It is to be noted that server(s) 782 can include one or more processors configured to provide at least in part the functionality of small cell network platform 780. To that end, the one or more processors can execute code instructions stored in memory 786, for example.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory, as non-volatile memory, disk storage, or memory storage. Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a user equipment (UE) device, comprising a receiver component configured to receive assistance information related to a plurality of candidate small cells. A control component configured to determine one or more cell-selection parameters based on the assistance information, identify a UE-specific cell set that comprises a subset of the plurality of candidate small cells, and select a first small cell from the UE-specific cell set based on the one or more cell-selection parameters. A transmitter component configured to facilitate an access operation or a handover operation with the first small cell by transmitting an access request message or a handover request message in response to selection of the first small cell by the control component.

Example 2 includes the subject matter of example 1, wherein the receiver component is further configured to receive the assistance information from a macro cell network device of a macro cell, or from a serving small cell network device of a serving small cell of the plurality of candidate small cells, and wherein the plurality of candidate small cells comprise another subset of small cells communicatively coupled to the macro cell.

Example 3 includes the subject matter of any of examples 1-2, including or omitting optional features, wherein the assistance information comprises identities of the plurality of candidate small cells from small cells communicatively coupled to a macro cell, or identities of small cell clusters, based on a UE location or a UE mobility datum.

Example 4 includes the subject matter of any of examples 1-3, including or omitting optional features, wherein the control component is further configured to select the UE-specific cell set based on an uplink measurement based on a UE polling signal, an uplink sounding reference signal, or a random access preamble, or from a downlink measurement based on a cell-specific reference signal or on a UE-specifically beam-formed synchronization signal.

Example 5 includes the subject matter of any of examples 1-4, including or omitting optional features, wherein the transmitter component is further configured to transmit a selection of the UE-specific cell set to a macro cell network device of a macro cell communicatively coupled to the plurality of candidate small cells or to a serving small cell network device of a serving small cell of the plurality of candidate small cells.

Example 6 includes the subject matter of any of examples 1-5, including or omitting optional features, wherein the assistance information comprises system information related to the plurality of candidate small cells, and at least one of a physical cell identity (PCI), a carrier frequency, a frame timing data, a cyclic prefix length, and a polling resource.

Example 7 includes the subject matter of any of examples 1-6, including or omitting optional features, wherein the transmitter component is further configured to communicate a polling signal to a plurality of candidate small cell network devices of the plurality of candidate small cells within a macro cell, the receiver component is further configured to receive a polling response message from at least one of the plurality of candidate small cell network devices or a macro cell network device of the macro cell in response to the polling message, and the control component is further configured to identify the UE-specific cell set based on the polling response message.

Example 8 includes the subject matter of any of examples 1-7, including or omitting optional features, wherein the polling response message comprises at least one of an updated system information of the UE-specific cell set, a UE-specific synchronization signal, an uplink timing advance value, an uplink resource allocation information, and a Cell Radio Network Temporary Identifier (C-RNTI).

Example 9 includes the subject matter of any of examples 1-8, including or omitting optional features, further comprising a buffer component configured to buffer a broadcast system information (SI) message of the plurality of candidate small cells, wherein the control component is configured to decode the broadcast SI message to select the UE-specific cell set or the first small cell from the UE-specific cell set.

Example 10 includes the subject matter of any of examples 1-9, including or omitting optional features, further comprising a polling component configured to periodically transmit a first UE polling signal with a first period to the UE-specific cell set and a second UE polling signal with a second period to the plurality of candidate small cells, wherein the first period is shorter than the second period, and initiate a polling response message from the UE-specific cell set and the plurality of candidate small cells with the first UE polling signal and the second UE polling signal.

Example 11 includes the subject matter of any of examples 1-10, including or omitting optional features, wherein the control component is further configured to periodically transmit a beam-formed uplink sounding reference signal (SRS) and receive a beam-formed downlink synchronization signal (SS) on which to perform downlink measurements to determine the one or more cell-selection parameters.

Example 12 includes the subject matter of any of examples 1-11, including or omitting optional features, wherein the transmitter component is further configured to transmit a UE polling signal responsive to a trigger event that includes at least one of an observed degradation in a link quality of a second small cell to which the UE device is connected or a decrease in a number of small cells with the link quality, which satisfies a predetermined threshold, within the UE-specific cell set, and wherein the transmitter component is further configured to transmit a measurement report on a macro cell frequency layer, the measurement report including downlink measurement results on the UE-specific cell set.

Example 13 is a computer-readable storage device storing executable instructions that, in response to execution, cause a system comprising a processor to perform operations. The operations comprise receiving, via a user equipment (UE), a set of assistance data related to a set of candidate small cells that the UE is configured to access in a macro cell assisted small cell network of a plurality of small cells communicatively coupled to a macro cell; identifying a UE-specific cell set that includes a subset of the set of candidate small cells based on the set of assistance data; transmitting an indication of the UE-specific cell set to facilitate an access operation to, or a handover operation; and selecting a first small cell from the UE-specific cell set based on one or more cell-selection parameters and directing the access or handover operation to a first small cell network device of the first small cell.

Example 14 includes the subject matter of example 13, wherein the operations further comprise selecting a second small cell from the UE-specific cell set based on the one or more cell-selection parameters; transmitting an access request message or a handover request message to a second small cell network device of the second small cell; and facilitating the handover operation from the first small cell to the second small cell.

Example 15 includes the subject matter of any of examples 13 or 14, including or omitting optional features, wherein the operations further comprise: determining the set of candidate small cells based on at least one of a UE location information within the macro cell assisted small cell network or a UE mobility parameter.

Example 16 includes the subject matter of any of examples 13-15, including or omitting optional features, wherein the operations further comprise receiving the indication of the UE-specific cell set from one or more small cell network devices of one or more small cells of the set of candidate small cells, wherein the UE-specific cell set is identified based on at least one of an uplink measurement, a downlink measurement, or an access load information of the set of candidate small cells.

Example 17 includes the subject matter of any of examples 13-16, including or omitting optional features, wherein the uplink measurement is based on at least one of a UE polling signal, an uplink sounding reference signal, or a random access preamble received by a set of candidate small cell network devices of the set of candidate small cells, wherein the downlink measurement is based on at least one of a cell-specific reference signal or a UE-specifically beamformed synchronization signal transmitted by the set of candidate small cell network devices.

Example 18 includes the subject matter of any of examples 13-17, including or omitting optional features, wherein the operations further comprise receiving one or more polling response messages from one or more small cell network devices of one or more small cells, wherein the one or more polling response messages include at least one of an up-to-date system data of the UE-specific cell set, a UE-specific synchronization signal, an uplink timing advance value, an uplink resource allocation data, or a cell radio network temporary identifier (C-RNTI).

Example 19 includes the subject matter of any of examples 13-18, including or omitting optional features, wherein the operations further comprise buffering broadcast system information (SI) messages for the set of candidate small cells communicated via the macro cell, and decoding the broadcast SI messages for the UE-specific cell set.

Example 20 includes the subject matter of any of examples 13-19, including or omitting optional features, wherein the operations further comprise periodically transmitting a first UE polling signal that includes a first period, to the UE-specific cell set and a second UE polling signal with a second period to a set of candidate small cell network devices of the set of candidate small cells to determine the one or more cell-selection parameters based on an uplink measurement, wherein the first period is shorter than the second period.

Example 21 includes the subject matter of any of examples 13-20, including or omitting optional features, wherein the operations further comprise performing a downlink measurement on the first small cell by periodically transmitting a beam-formed uplink sounding reference signal (SRS) and receiving a beam-formed downlink synchronization signal (SS).

Example 22 includes the subject matter of any of examples 13-21, including or omitting optional features, wherein the operations further comprise transmitting a UE polling signal in response to an event-trigger comprising a degradation in at least one of a link quality of the first small cell or a decrease in a number of small cells with the link quality satisfying a predetermined threshold within the UE-specific cell set.

Example 23 includes the subject matter of any of examples 13-22, including or omitting optional features, wherein the operations further comprise communicating downlink measurement results on the UE-specific cell set in a measurement report on a macro cell frequency layer.

Example 24 is an enhanced Node B (eNB) comprising a communication component configured to transmit dedicated assistance information related to a set of candidate small cells to a user equipment (UE); and a control component configured to identify or update a UE-specific cell set that includes a subset of one or more small cells of the set of candidate small cells within a macro cell with respect to the UE. The communication component is further configured to facilitate the UE to select a target small cell from the UE-specific cell set to access, or handover to, by communicating the UE-specific cell set to the UE, and receive an indication of a connection between the UE and a target small cell network device of the target small cell in response to the UE directly generating the access or the handover to the target small cell based on the dedicated assistance information.

Example 25 includes the subject matter of example 24 wherein the control component is further configured to determine the UE-specific cell set based on at least one of an uplink measurement comprising at least one of a UE polling signal, an uplink sounding reference signal, or a random access preamble, and wherein the communication component is further configured to receive a measurement report on a macro cell frequency layer, the measurement report including downlink measurement results on the UE-specific cell set.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:
1. A user equipment (UE) device, comprising:
a receiver component configured to receive assistance information related to a plurality of candidate small cells;

a control component configured to determine one or more cell-selection parameters based on the assistance information, identify a UE-specific cell set that comprises a subset of the plurality of candidate small cells, and select a first small cell from the UE-specific cell set based on the one or more cell-selection parameters; and a transmitter component configured to facilitate an access operation or a handover operation with the first small cell by transmitting an access request message or a handover request message in response to selection of the first small cell by the control component, and transmit a UE polling signal responsive to a trigger event that includes at least one of an observed degradation in a link quality of a second small cell to which the UE device is connected or a decrease in a number of small cells with the link quality, which satisfies a predetermined threshold, within the UE-specific cell set, and transmit a measurement report on a macro cell frequency layer, the measurement report including downlink measurement results on the UE-specific cell set.

2. The UE device of claim 1, wherein the receiver component is further configured to receive the assistance information from a macro cell network device of a macro cell, or from a serving small cell network device of a serving small cell of the plurality of candidate small cells, and wherein the plurality of candidate small cells comprise another subset of small cells communicatively coupled to the macro cell.

3. The UE device of claim 1, wherein the assistance information comprises identities of the plurality of candidate small cells from small cells communicatively coupled to a macro cell, or identities of small cell clusters, based on a UE location or a UE mobility datum.

4. The UE device of claim 1, wherein the control component is further configured to select the UE-specific cell set based on an uplink measurement based on the UE polling signal, an uplink sounding reference signal, or a random access preamble, or from a downlink measurement based on a cell-specific reference signal or on a UE-specifically beam-formed synchronization signal.

5. The UE device of claim 1, wherein the transmitter component is further configured to transmit a selection of the UE-specific cell set to a macro cell network device of a macro cell communicatively coupled to the plurality of candidate small cells or to a serving small cell network device of a serving small cell of the plurality of candidate small cells.

6. The UE device of claim 1, wherein the assistance information comprises system information related to the plurality of candidate small cells, and at least one of a physical cell identity (PCI), a carrier frequency, a frame timing data, a cyclic prefix length, and a polling resource.

7. The UE device of claim 1, wherein the transmitter component is further configured to communicate the UE polling signal to a plurality of candidate small cell network devices of the plurality of candidate small cells within a macro cell, the receiver component is further configured to receive a polling response message from at least one of the plurality of candidate small cell network devices or a macro cell network device of the macro cell in response to the polling message, and the control component is further configured to identify the UE-specific cell set based on the polling response message.

8. The UE device of claim 7, wherein the polling response message comprises at least one of an updated system information of the UE-specific cell set, a UE-specific synchronization signal, an uplink timing advance value, an uplink resource allocation information, and a Cell Radio Network Temporary Identifier (C-RNTI).

9. The UE device of claim 1, further comprising:
a buffer component configured to buffer a broadcast system information (SI) message of the plurality of candidate small cells, wherein the control component is configured to decode the broadcast SI message to select the UE-specific cell set or the first small cell from the UE-specific cell set.

10. The UE device of claim 1, further comprising:
a polling component configured to periodically transmit a first UE polling signal with a first period to the UE-specific cell set and a second UE polling signal with a second period to the plurality of candidate small cells, wherein the first period is shorter than the second period, and initiate a polling response message from the UE-specific cell set and the plurality of candidate small cells with the first UE polling signal and the second UE polling signal.

11. The UE device of claim 1, wherein the control component is further configured to periodically transmit a beam-formed uplink sounding reference signal (SRS) and receive a beam-formed downlink synchronization signal (SS) on which to perform downlink measurements to determine the one or more cell-selection parameters.

12. A computer-readable storage device storing executable instructions that, in response to execution, cause a system comprising a processor to perform operations, comprising:
receiving, via a user equipment (UE), a set of assistance data related to a set of candidate small cells that the UE is configured to access in a macro cell assisted small cell network of a plurality of small cells communicatively coupled to a macro cell;
identifying a UE-specific cell set that includes a subset of the set of candidate small cells based on the set of assistance data;
transmitting an indication of the UE-specific cell set to facilitate an access operation to, or a handover operation;
selecting a first small cell from the UE-specific cell set based on one or more cell-selection parameters and directing the access or handover operation to a first small cell network device of the first small cell; and
transmitting a UE polling signal in response to an event-trigger comprising a degradation in at least one of a link quality of the first small cell or a decrease in a number of small cells with the link quality satisfying a predetermined threshold within the UE-specific cell set.

13. The computer-related storage device of claim 12, wherein the operations further comprise:
selecting a second small cell from the UE-specific cell set based on the one or more cell-selection parameters;
transmitting an access request message or a handover request message to a second small cell network device of the second small cell; and
facilitating the handover operation from the first small cell to the second small cell.

14. The computer-related storage device of claim 12, wherein the operations further comprise:
determining the set of candidate small cells based on at least one of a UE location information within the macro cell assisted small cell network or a UE mobility parameter.

15. The computer-related storage device of claim 12, wherein the operations further comprise:

receiving the indication of the UE-specific cell set from one or more small cell network devices of one or more small cells of the set of candidate small cells, wherein the UE-specific cell set is identified based on at least one of an uplink measurement, a downlink measurement, or an access load information of the set of candidate small cells.

16. The computer-related storage device of claim 15, wherein the uplink measurement is based on at least one of the UE polling signal, an uplink sounding reference signal, or a random access preamble received by a set of candidate small cell network devices of the set of candidate small cells, wherein the downlink measurement is based on at least one of a cell-specific reference signal or a UE-specifically beam-formed synchronization signal transmitted by the set of candidate small cell network devices.

17. The computer-related storage device of claim 12, wherein the operations further comprise:
receiving one or more polling response messages from one or more small cell network devices of one or more small cells, wherein the one or more polling response messages include at least one of an up-to-date system data of the UE-specific cell set, a UE-specific synchronization signal, an uplink timing advance value, an uplink resource allocation data, or a cell radio network temporary identifier (C-RNTI).

18. The computer-related storage device of claim 12, wherein the operations further comprise:
buffering broadcast system information (SI) messages for the set of candidate small cells communicated via the macro cell, and decoding the broadcast SI messages for the UE-specific cell set.

19. The computer-related storage device of claim 12, wherein the operations further comprise:
periodically transmitting a first UE polling signal that includes a first period, to the UE-specific cell set and a second UE polling signal with a second period to a set of candidate small cell network devices of the set of candidate small cells to determine the one or more cell-selection parameters based on an uplink measurement, wherein the first period is shorter than the second period.

20. The computer-related storage device of claim 12, wherein the operations further comprise:
performing a downlink measurement on the first small cell by periodically transmitting a beam-formed uplink sounding reference signal (SRS) and receiving a beam-formed downlink synchronization signal (SS).

21. The computer-related storage device of claim 12 wherein the operations further comprise:
communicating downlink measurement results on the UE-specific cell set in a measurement report on a macro cell frequency layer.

22. An enhanced Node B (eNB) comprising:
a communication component configured to transmit dedicated assistance information related to a set of candidate small cells to a user equipment (UE); and
a control component configured to identify or update a UE-specific cell set that includes a subset of one or more small cells of the set of candidate small cells within a macro cell with respect to the UE;
wherein the communication component is further configured to facilitate the UE to select a target small cell from the UE-specific cell set to access, or handover to, by communicating the UE-specific cell set to the UE, and receive an indication of a connection between the UE and a target small cell network device of the target small cell in response to the UE directly generating the access or the handover to the target small cell based on the dedicated assistance information, and provide one or more polling response messages to the UE, wherein the one or more polling response messages include at least one of an up-to-date system data of the UE-specific cell set, a UE-specific synchronization signal, an uplink timing advance value, an uplink resource allocation data, or a cell radio network temporary identifier (C-RNTI).

23. The eNB of claim 22, wherein the control component is further configured to determine the UE-specific cell set based on at least one of an uplink measurement comprising at least one of a UE polling signal, an uplink sounding reference signal, or a random access preamble, and wherein the communication component is further configured to receive a measurement report on a macro cell frequency layer, the measurement report including downlink measurement results on the UE-specific cell set.

* * * * *